United States Patent
Shintani

(10) Patent No.: US 8,094,216 B2
(45) Date of Patent: Jan. 10, 2012

(54) IMAGE PROCESSING APPARATUS, METHOD FOR CONTROLLING IMAGE PROCESSING APPARATUS, AND STORAGE MEDIUM

(75) Inventor: Takuya Shintani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 12/495,987

(22) Filed: Jul. 1, 2009

(65) Prior Publication Data

US 2010/0002103 A1 Jan. 7, 2010

(30) Foreign Application Priority Data

Jul. 3, 2008 (JP) ................................ 2008-174955

(51) Int. Cl.
*H04N 9/64* (2006.01)
(52) U.S. Cl. .................................. 348/251; 348/208.99
(58) Field of Classification Search ............. 348/208.99, 348/208.1, 208.2, 231.3, 241, 251
See application file for complete search history.

(56) References Cited

U.S. PATENT DOCUMENTS

| | | | | |
|---|---|---|---|---|
| 2007/0285522 A1* | 12/2007 | Kimura | ..................... | 348/208.99 |
| 2008/0025650 A1* | 1/2008 | Kotani | .......................... | 382/309 |
| 2008/0240608 A1* | 10/2008 | Ishii | .............................. | 382/275 |

FOREIGN PATENT DOCUMENTS

| | | |
|---|---|---|
| JP | 6-105241 | 4/1994 |
| JP | 2001-223894 | 8/2001 |
| JP | 2003-289495 | 10/2003 |

* cited by examiner

*Primary Examiner* — Gevell Selby
(74) *Attorney, Agent, or Firm* — Canon USA Inc. IP Division

(57) ABSTRACT

Foreign substance information including information on a position and size of a foreign substance in an imaging unit is acquired. When correcting a shadow of the foreign substance of the moving image data using the acquired foreign substance information and playing back the corrected moving image data, a selection is made whether to perform processing for correcting the shadow of the foreign substance of a frame based on the data size of the frame of the moving image data to be played back.

10 Claims, 22 Drawing Sheets

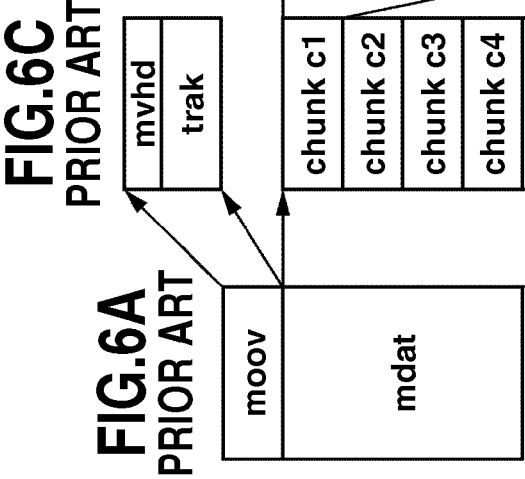

| PARAMETER | SETTING |
|---|---|
| DIAPHRAGM | F22 |
| ISO | 400 |
| SHUTTER SPEED | 1/30 |
| LIGHT METERING MODE | AVERAGE LIGHT METERING |
| FLASH FIRING | PROHIBITED |
| EXPOSURE CORRECTION | PROHIBITED |
| AF MODE | MANUAL |

FIG.14

| ADDRESS OFFSET (Hex) | CODE (Hex) | MEANING |
|---|---|---|
| +00 | FF | Prefix |
| +01 | E0 | |
| +02 | | F VALUE (NUMERATOR) |
| +04 | | F VALUE (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | DUST REGION $D_1$ PARAMETERS<br>  RADIUS (2 BYTES)<br>    X COORDINATE OF CENTER (2 BYTES)<br>    Y COORDINATE OF CENTER (2 BYTES) |
| | | DUST REGION $D_2$ PARAMETERS |
| | | . . . |
| | | DUST REGION $D_n$ PARAMETERS |

IMAGE PROCESSING APPARATUS, METHOD FOR CONTROLLING IMAGE PROCESSING APPARATUS, AND STORAGE MEDIUM

BACKGROUND OF THE INVENTION

1. Field of the Invention

The present invention relates to, in an imaging apparatus which uses an image sensor such as a charge-coupled device (CCD) and a complementary metal-oxide semiconductor, a technology for reducing image degradation caused by a foreign substance which is adhered to a surface of an optical low pass filter and the like arranged on a front face of the image sensor. More particularly, the present invention relates to a technology for reducing image degradation caused by a foreign substance when capturing a moving image.

2. Description of the Related Art

Recently, there is a need for a technology which can encode moving image information into digital data at a high compression ratio with a high image quality for use in processing, storage, and transmission thereof. For compression of image information, methods such as Moving Picture Experts Group (MPEG), which compresses and encodes image information by orthogonal transformation such as a discrete cosine transform and by movement prediction/movement compensation utilizing redundancy specific to moving image information, have been proposed and widely spread.

Manufacturers develop and commercialize imaging apparatuses, such as digital cameras and digital video cameras, or Digital Versatile Disk (DVD) recorders, which can record images by utilizing these coding formats. Further, a user can easily view an image using these apparatuses, a personal computer, a DVD player, and the like.

Recently, MPEG4-Part 10 AVC (H.264) has been developed as a coding format aiming for an even higher compression ratio and higher image quality. Compared with conventional coding formats such as MPEG2 and MPEG4, although H.264 requires a greater amount of calculations for the coding and decoding, H.264 is known to be able to achieve a higher coding efficiency.

FIG. 1 illustrates a configuration of an image processing apparatus that compresses image data by the H.264 format.

In FIG. 1, input image data is divided into macro blocks, which are sent to a subtraction unit 101. The subtraction unit 101 calculates a difference between the image data and a predicted value, and outputs this difference to an integer Discrete Cosine Transform (DCT) transformation unit 102. The integer DCT transformation unit 102 transforms the input data using the integer DCT, and outputs the transformed data to a quantization unit 103. The quantization unit 103 quantizes the input data.

One part of the quantized data is sent to an entropy coding unit 115 as difference image data. The other part of the quantized data is inverse-quantized by a dequantization unit 104, and then subjected to inverse integer DCT transformation by an inverse integer DCT transformation unit 105. The data subjected to inverse integer DCT transformation is added with a predicted value by an addition unit 106. As a result, the image is restored.

One part of the restored data is sent to a frame memory 107 for intra (intra-frame) prediction. The other part of the restored data is subjected to deblocking filter processing by a deblocking filter 109, and then the resultant data is sent to a frame memory 110 for inter (inter-frame) prediction.

The image in the frame memory 107 for intra prediction is used for an intra prediction by an intra prediction unit 108. In this intra prediction, a value of an adjacent pixel of an already coded block in the same picture is used as the predicted value.

The image in the frame memory 110 for inter prediction is constituted by a plurality of pictures, as is described below. The plurality of pictures are divided into two lists, a "list 0" and a "list 1". The plurality of pictures divided into the two lists are used in an inter prediction by an inter prediction unit 111.

After the inter prediction is performed, the internal image is updated by a memory controller 113. In the inter prediction performed by the inter prediction unit 111, a predicted image is determined using an optimum movement vector based on a movement detection result performed by a movement detection unit 112 on image data from a different frame.

As a result of the intra prediction and the inter prediction, the optimum prediction is selected by a selection unit 114. Further, the movement vector is sent to the entropy coding unit 115, and is coded along with the difference image data. As a result, an output bit stream is formed.

The H.264 format inter prediction will now be described in more detail using FIGS. 2 to 5.

In the H.264 format inter prediction, a plurality of pictures can be used for the prediction. Therefore, to specify a reference picture, two lists (the "List 0" and the "List 1") are prepared. Each list is assigned with a maximum of five reference pictures.

For P pictures, forward direction prediction is mainly performed using only the "List 0". For B pictures, bidirectional prediction (or, only forward direction or backward direction prediction) is performed using the "List 0" and the "List 1". Namely, in the "List 0", pictures mainly for forward direction prediction are assigned, and in the "List 1", pictures mainly for backward direction prediction are assigned.

FIG. 2 illustrates an example of a reference list used during coding. This example will be described using an example of a case where the ratio between the P pictures and the B pictures is typical. Namely, this example is described for the case where I pictures have a 15 frame interval, the P pictures have a 3 frame interval, and there are two B picture frames between the P pictures.

In FIG. 2, pieces of image data 201 are lined up in a display order. In the rectangles of image data 201, numerals representing the picture type and display order are written.

For example, picture I15 is an I picture which is fifteenth in the display order, and only intra prediction is performed. Picture P18 is a P picture, which is eighteenth in the display order, and only forward direction prediction is performed. Picture B16 is a B picture, which is sixteenth in the display order, and bidirectional prediction is performed.

The order in which coding is performed is different from the display order, and is the order in which prediction is performed. Namely, in FIG. 2, the order in which prediction is performed is "I15, P18, B16, B17, P21, B19, B20, . . . ".

Further, in FIG. 2, restored pictures which have once undergone coding are contained in a reference list (List 0) 202. For example, when performing inter prediction with a picture P21 (twenty-first P picture in the display order), restored pictures for which coding is already finished are referenced in the reference list (List 0) 202. In the example illustrated in FIG. 2, pictures P06, P09, P12, I15, and P18 are contained in the reference list 202.

In the inter prediction, the movement vector having the optimum predicted value from among the reference pictures in this reference list (List 0) 202 is determined and coded for each macro block. The pictures in the reference list (List 0) 202 are provided with a reference picture number in order to distinguish them (the pictures are provided with a number different from that illustrated in FIG. 2).

When the coding of the picture P21 is finished, next the picture P21 is decoded and newly added to the reference list (List 0) 202. From the reference list (List 0) 202, the oldest reference picture (here, picture P06) is removed. Subsequently, the coding is performed on pictures B19 and B20, and continues on to picture P24. The state of the reference list (List 0) 202 at this stage is illustrated in FIG. 3.

FIG. 4 illustrates a changing state of the reference list for each picture. In FIG. 4, the pictures are coded in order from the top. FIG. 4 also illustrates the picture undergoing coding and the contents of the reference lists (List 0 and List 1) with respect to the picture undergoing coding.

As illustrated in FIG. 4, when the P picture (or I picture) is coded, the reference lists (List 0 and List 1) are updated, and the oldest picture in the reference lists (List 0 and List 1) is removed. In this example, the reference list (List 1) only has one picture.

This is because if the number of pictures to be referenced for backward direction prediction is increased, the buffer amount until the encoding is completed increases. Namely, this is to avoid referencing a backward direction picture that is very far away from the picture undergoing coding.

In this example, the pictures used in referencing are I pictures and P pictures. All of the I pictures and the P pictures are added in series to the reference lists (List 0 and List 1). Further, the pictures used in the reference list (List 1) for backward direction prediction are only the I pictures.

That is because this is the most commonly used picture configuration. However, the picture configuration in such reference lists is merely an example of what is probably most commonly used. H.264 itself has a higher degree of freedom in its reference list configuration.

For example, it is not necessary to add all of the I pictures and the P pictures to the reference lists. The B pictures may also be added to the reference lists. Further, a long duration reference list that keeps staying in the reference list until it is explicitly instructed to be removed is also defined.

FIG. 5 illustrates a changing state of the reference list when B pictures are added to the reference lists. When adding B pictures to the reference lists, generally, one way to do this is to add the coded picture each time when any of the B pictures is coded.

Next, a file format for recording the thus-compressed moving image data will be described. As described above, the MP4 (MPEG-4) file format is used as a multipurpose format for recording MPEG (MPEG-2 or MPEG-4 format) image data captured by a digital video camera, digital still camera and the like. By recording as an MP4 file, compatibility, such as being able to play back with another digital device, is assured.

As illustrated in FIG. 6A, MP4 files basically includes a "mdat box" which contains coded stream image data, and a "moov box" which contains information related to the stream image data. As illustrated in FIG. 6B, the "mdat box" includes a plurality of chunks (chunk cN). As illustrated in FIG. 6D, each chunk includes a plurality of samples (sample sM).

As illustrated in FIG. 6E, the respective samples are configured so that coded MPEG data of I0, B-2, B-1, P3 . . . corresponds to sample s1, sample s2, sample s3, sample s4 . . . .

Here, I0, I1, I2, . . . , In are pieces of frame image data which have been intra coded (intra-frame coded), B0, B1, B2, . . . , Bn are pieces of frame image data which have been inter coded (inter-frame coded) using bidirectional referencing, and P0, P1, P2, . . . , Pn are pieces of frame image data which have been referenced and coded (inter-frame coded) from a single direction (order direction). All of these pieces of data are variable length coded data.

As illustrated in FIG. 6C, the "moov box" is includes a "mvhd box" having header information in which the creation date and the like is recorded, and a "trak box" having information relating to the stream image data stored in the "mdat box".

Examples of the information stored in the "trak box" include a "stco box" which stores information about an offset value for each chunk in the "mdat box" as illustrated in FIG. 6H, a "stsc box" which stores information about the sample number in each chunk as illustrated in FIG. 6G, and a "stsz box" which stores information about the size of each sample as illustrated in FIG. 6F.

Therefore, the data amount stored in the "stco box", "stsc box", and "stsz box" increases along with the amount of recorded image data, that is, the recording time.

For example, when an image of 30 frames per second is recorded as an MP4 file so that each of 15 frames is stored in one chunk, in two hours data of about 1 Mbyte is generated, which means that a "moov box" having a 1 Mbyte capacity is required.

When playing back this MP4 file, each of the chunks in the "mdat box" can be accessed by reading the "moov box" of the MP4 file from the recording medium, and analyzing the "stco box", "stsc box", and "stsz box" in that "moov box".

When recording in the MP4 file format, the stream data increases with time. Further, since the size is so large, the stream data needs to be written into the file also during recording.

However, as described above, since the size of the "moov box" also increases according to the recording time, and since the size of the MP4 header is also unknown until recording is finished, the offset position for writing into the file of the stream data cannot be determined. Therefore, for recording in a typical moving image processing apparatus, the following procedures are performed taking advantage of the flexibility of the MP4 file format.

(1) The "mdat box" is arranged at the head of the file, and the "moov box" is arranged behind the mdat box when the recording is finished (FIG. 7A).

(2) As discussed in Japanese Patent Application Laid-Open No. 2003-289495, the size of the moov box is pre-determined, the mdat box offset position is determined, and recording is performed (FIG. 7B). Even when the recording time is short, and the header region has free capacity, that region is left as a free box. When performing recording more than the header size, the header size can be maintained in the pre-determined size by performing the recording so that frame number information of the I pictures is thinned as needed.

(3) A "moov box" and "mdat box" pair is arranged by dividing up into a plurality of pairs (FIG. 7C). Here, the second and subsequent header regions are referred to as a "moof box". They are the common configurations of MP4 files.

A typical playback method of the MP4 files will now be described. FIG. 8 illustrates a basic example configuration of a moving image playback apparatus for playing back moving images that are compressed and coded by the H.264 format.

In FIG. 8, the moving image playback apparatus includes a recording medium 801, a playback circuit 802 for playing back data from the recording medium 801, a buffer circuit 803, a variable length decoding circuit 804, a dequantization circuit 805, an inverse DCT circuit 806, an addition circuit 807, a memory 808, a movement compensation circuit 809, a switch circuit 810, an arrangement circuit 811, an output terminal 812, a header information analysis circuit 813, a playback control circuit 814, and a control signal input terminal 815.

Next, a flow of the playback processing of the moving image playback apparatus in FIG. 8 will be described.

When the playback circuit 802 receives an instruction from the playback control circuit 814, the playback circuit 802 plays back the MP4 file recorded in the recording medium 801, and starts to supply the played back MP4 file to the buffer circuit 803. Simultaneously, the playback control circuit 814 controls the header information analysis circuit 813 so as to analyze the offset, chunk, and sample information received from the "stso box", "stsc box", and "stsz box" indicating a storage state in the mdat of the moov box.

Then, the playback control circuit 814 controls the playback circuit 802 so as to start playing back the stream image data in the mdat box from the recording medium 801.

The playback circuit 802 plays back the stream image data in the "mdat box" of the file recorded in the recording medium 801 from its head address, and supplies the stream image data to the buffer circuit 803. The playback control circuit 814 starts to read the stream image data stored in the buffer circuit 803 while looking at the occupancy state and the like in the buffer circuit 803, and supplies the stream image data to the variable length decoding circuit 804.

The variable length decoding circuit 804 performs variable length decoding on the played back stream image data supplied from the buffer circuit 803, and sends the resultant data to the dequantization circuit 805.

The dequantization circuit 805 dequantizes the stream image data supplied from the variable length decoding circuit 804 and on which variable length decoding is performed, and supplies the resultant data to the inverse DCT circuit 806.

The inverse DCT circuit 806 performs an inverse DCT on the dequantized data supplied from the dequantization circuit 805, and supplies the resultant data to the addition circuit 807. The addition circuit 807 adds data supplied from the switch circuit 810 to the data supplied from the inverse DCT circuit 806.

Here, in the stream image data played back from the recording medium 801, as illustrated in FIG. 9, first, I0 intra-frame coded in the Group Of Pictures (GOP) 0 is played back. Therefore, the playback control circuit 814 performs a control to select a terminal "a" of the switch circuit 810, and the switch circuit 810 supplies a piece of data "0" to the addition circuit 807.

The addition circuit 807 adds the piece of "0" data supplied from the switch circuit 810 and the piece of inverse DCT data supplied from the inverse DCT circuit 806, and supplies the resultant data to the memory 808 and the arrangement circuit 811 as a played back frame F0. The memory 808 stores the added data supplied from the addition circuit 807.

Bidirectionally prediction coded picture data B-2 and B-1 will be played back after the intra-frame coded I0 data of the GOP 0. However, since the playback processing up to the inverse DCT circuit 806 is the same as the playback processing described above for the intra-frame coded I0 data, the description thereof is omitted.

The inverse DCT bidirectionally prediction coded image data from the inverse DCT circuit 806 is supplied to the addition circuit 807. At this stage, the playback control circuit 814 controls the switch circuit 810 so that a movable terminal c of the switch circuit 810 selects a fixed terminal b, and supplies data from the movement compensation circuit 809 to the addition circuit 807.

The movement compensation circuit 809 detects the movement vector, which is generated during coding and recorded in the stream image data. Further, the movement compensation circuit 809 reads data from the reference block (in this case, since the recording is just starting, this is only the data from the played back intra-frame coded data F0) from the memory 808, and supplies the read data to the movable terminal c of the switch circuit 810.

The addition circuit 807 adds the inverse DCT transformed data supplied from the inverse DCT circuit 806 and the movement compensated data supplied from the switch circuit 810, and supplies the resultant data to the arrangement circuit 811 as played back frames F-2 and F-1.

Unidirectionally prediction coded picture data P3 will be played back next. However, since the playback processing up to the inverse DCT circuit 806 is the same as the playback processing described above for the intra-frame coded I0 data, the description thereof is omitted.

The inverse DCT coded picture data from the inverse DCT circuit 806 is supplied to the addition circuit 807. At this stage, the playback control circuit 814 controls the switch circuit 810 so that the movable terminal c of the switch circuit 810 selects the fixed terminal b, and supplies the data from the movement compensation circuit 809 to the addition circuit 807.

The movement compensation circuit 809 detects the movement vector, which is generated during cording and recorded in the stream image data, from the played back stream image data. Further, the movement compensation circuit 809 reads data in the reference block (the data from the played back intra-frame coded data F0) from the memory 808, and supplies the read data to the movable terminal c of the switch circuit 810.

The addition circuit 807 adds the inverse DCT data supplied from the inverse DCT circuit 806 and the movement compensated data supplied from the switch circuit 810, supplies the resultant data to the memory 808 and the arrangement circuit 811 as a played back frame F3. The memory 808 stores the addition data supplied from the addition circuit 807.

Pictures B1 and B2 are played back next. However, since the frames are not at the start of recording, the same processing as described above for B-1 and B-2 is used for playback, except that the frames are played back from frames F0 and F3 as the bidirectional prediction. Thus, as described above, P6, B4, B5, . . . are successively played back.

The arrangement circuit 811 arranges the successively-read frames F0, F-2, F-1, F3, F1, F2, F6, F4, F5, . . . in the order of F-2, F-1, F0, F1, F3, F4, F5, F6, . . . and outputs the arranged frames to the output terminal 812.

When starting playback of the above-described file, the header information analysis circuit 813 analyzes the offset, chunk, and sample information obtained from the "stso box", "stsc box", and "stsz box" indicating the storage state in the "mdat" of the "moov box" of the MP4 file. Therefore, the playback control circuit 814 skips to a GOP1, and works to start the next playback from the GOP1.

For an interchangeable-lens digital camera, when removing the lens from the camera body, dust or the like floating in the air can intrude into the interior of the camera body. Further, various mechanical parts that are mechanically operated, such as a shutter mechanism, are provided in the camera interior. When these mechanical parts are operated, particles such as metal particles can be produced in the camera body.

If a foreign substance such as these particles or dust adhere to a surface of the image sensor provided with an imaging unit of the digital camera, the foreign substance can be photographed as a shadow in the captured image, and thereby the quality of the captured image deteriorates.

To resolve such a problem, there is a correction method which uses signals output from the pixels surrounding the portion on which the shadow of the foreign substance is photographed. As a technology usable for correcting the shadow of the foreign substance, Japanese Patent Application Laid-Open No. 2003-289495 discusses an image defect correction method for correcting an image defect on the image sensor.

Further, Japanese Patent Application Laid-Open No. 6-105241 discusses, in order to simplify setting of position information of the image defect, a method for correcting a correction target image by making an extension of an image file captured in a dust acquisition mode to be different from that of a normal image, automatically determining a dust information image on the PC side, and using that information to correct the correction target image.

Further, there are also products which perform correction of the correction target image by recording the above-described dust information in the captured image file as photographic information, and subsequently using that information.

However, playing back a moving image file like the above-described MP4 file while correcting the correction target image based on the above dust information causes problems, such as an increase in the memory amount to be used, and deterioration in the quality of the moving image playback due to deterioration in the operating speed.

For still image playback, to play back the still image after dust correction, just one dust correction is needed for one image. Even if the dust correction processing takes time due to restrictions on memory and the like, since this is playback of a still image, the inconvenience of waiting until the dust correction processing is completed is small.

However, for moving image playback, movement of the images is expressed by continuously playing back a plurality of still images at, for example, 15 frames or 30 frames per second. Therefore, in addition to the normal playback processing, the dust correction processing has to be performed 15 times per second for 15 frames, and 30 times for 30 frames, which means that natural moving image playback cannot be performed unless the processing is finished in such a limited time.

SUMMARY OF THE INVENTION

The present invention is directed to an image processing apparatus and a method for controlling the image processing apparatus, in which operating speed when correcting a shadow of a foreign substance in moving image data is improved and an amount of resources to be used such as memory is reduced.

According to an aspect of the present invention, an image processing apparatus for playing back moving image data, which is output from an imaging unit including an imaging sensor configured to capture a target image and an optical member arranged in front of the imaging sensor, that includes a shadow of a foreign substance adhered to a surface of the optical member, the image processing apparatus comprising, an acquisition unit configured to acquire foreign substance information that includes information on a position and a size of the foreign substance in the imaging unit, a playback unit capable of correcting the shadow of the foreign substance of the moving image data using the foreign substance information acquired by the acquisition unit and playing back corrected moving image data, and a selection unit configured to select whether to perform processing for correcting the shadow of the foreign substance of a frame based on a data size of the frame of the moving image data to be played back by the playback unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A to 6H illustrate a configuration of an MP4 file.

FIG. 14 illustrates a data format example of dust correction information.

DETAILED DESCRIPTION OF THE EMBODIMENTS

Various exemplary embodiments, features, and aspects of the invention will be described in detail below with reference to the drawings.

First, the imaging apparatus configuration common to each of exemplary embodiments of the present invention will be described with reference to FIG. 10. In the exemplary embodiments of the present invention, a digital still camera is used as an example of the imaging apparatus. However, the imaging apparatus may also be a digital video camera and the like capable of interchanging lenses.

Figure 1:
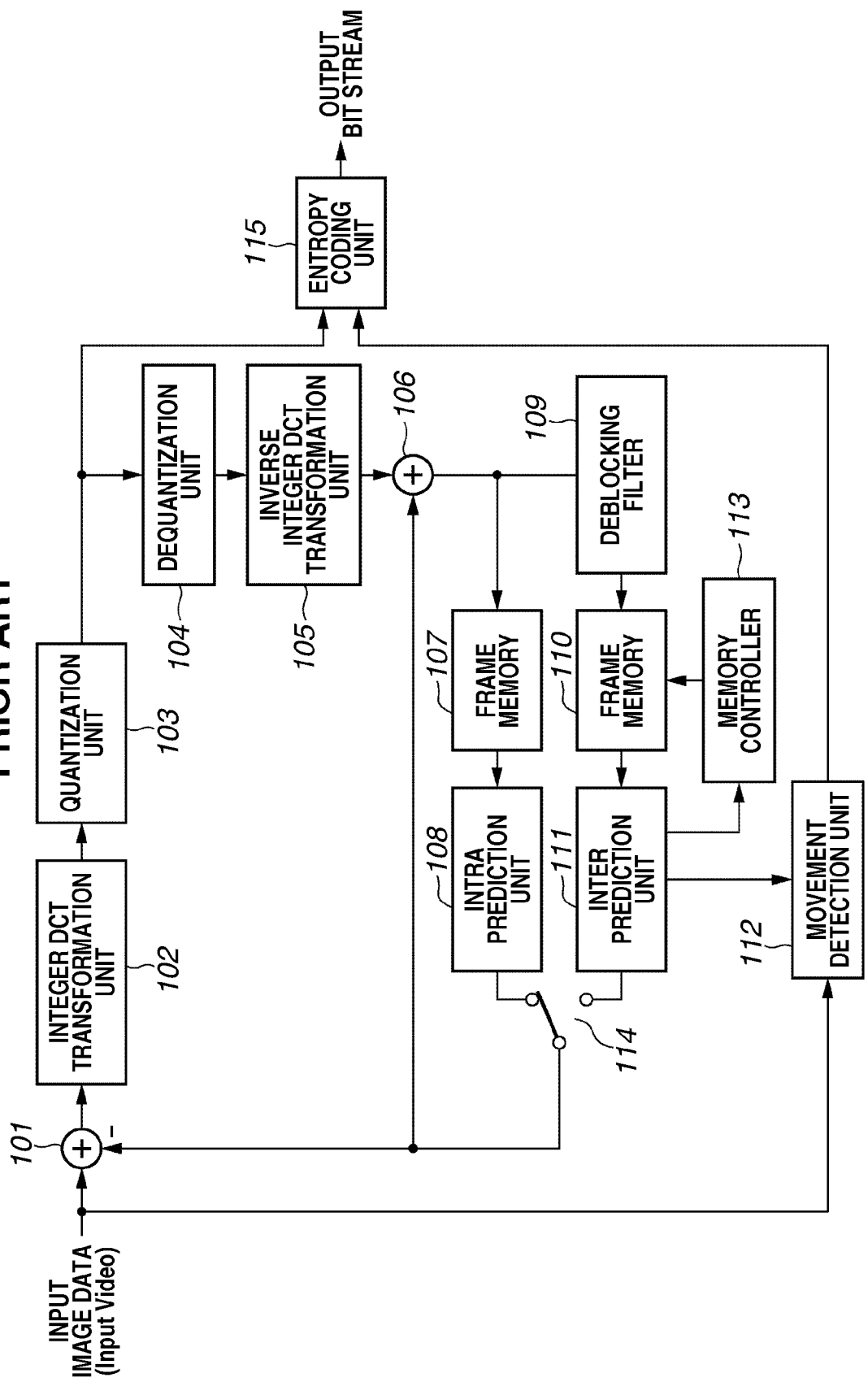
FIG. 1 is a block diagram illustrating a conventional configuration of an image processing apparatus.
Figure 2:
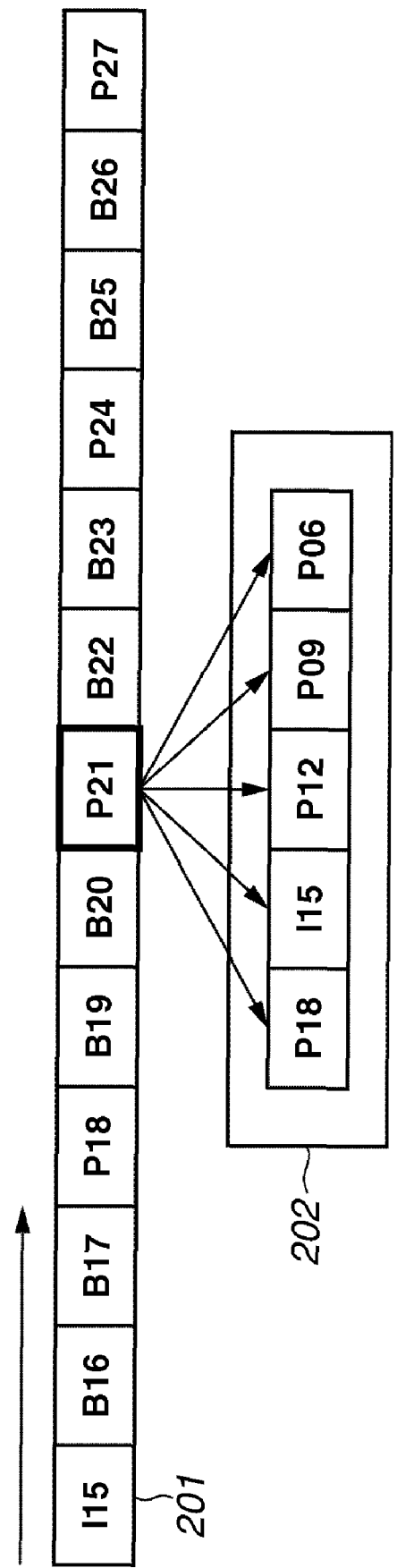
FIG. 2 illustrates an example reference list during coding of a picture P21.
Figure 3:
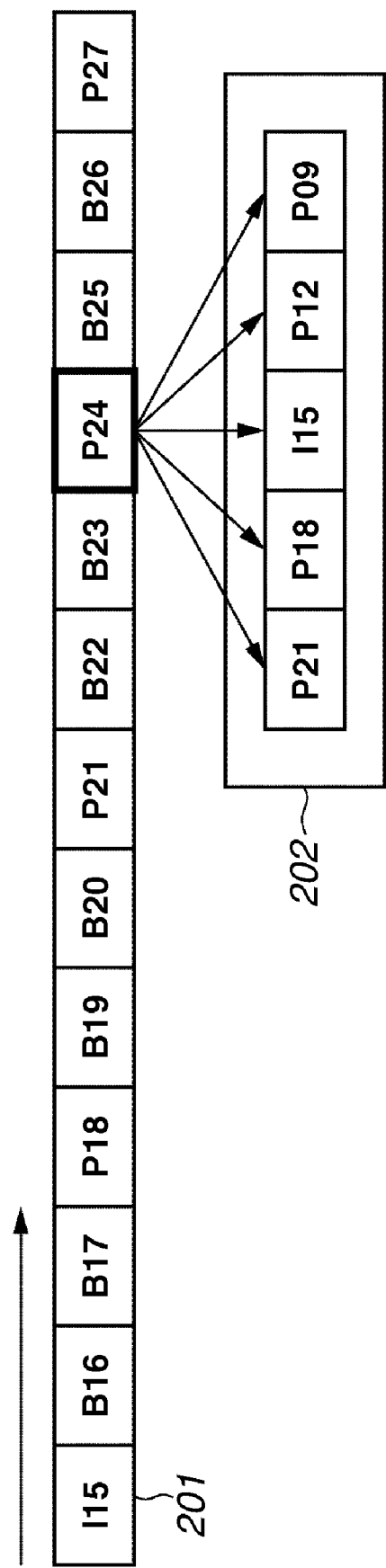
FIG. 3 illustrates an example reference list during coding of a picture P24.
Figure 4:
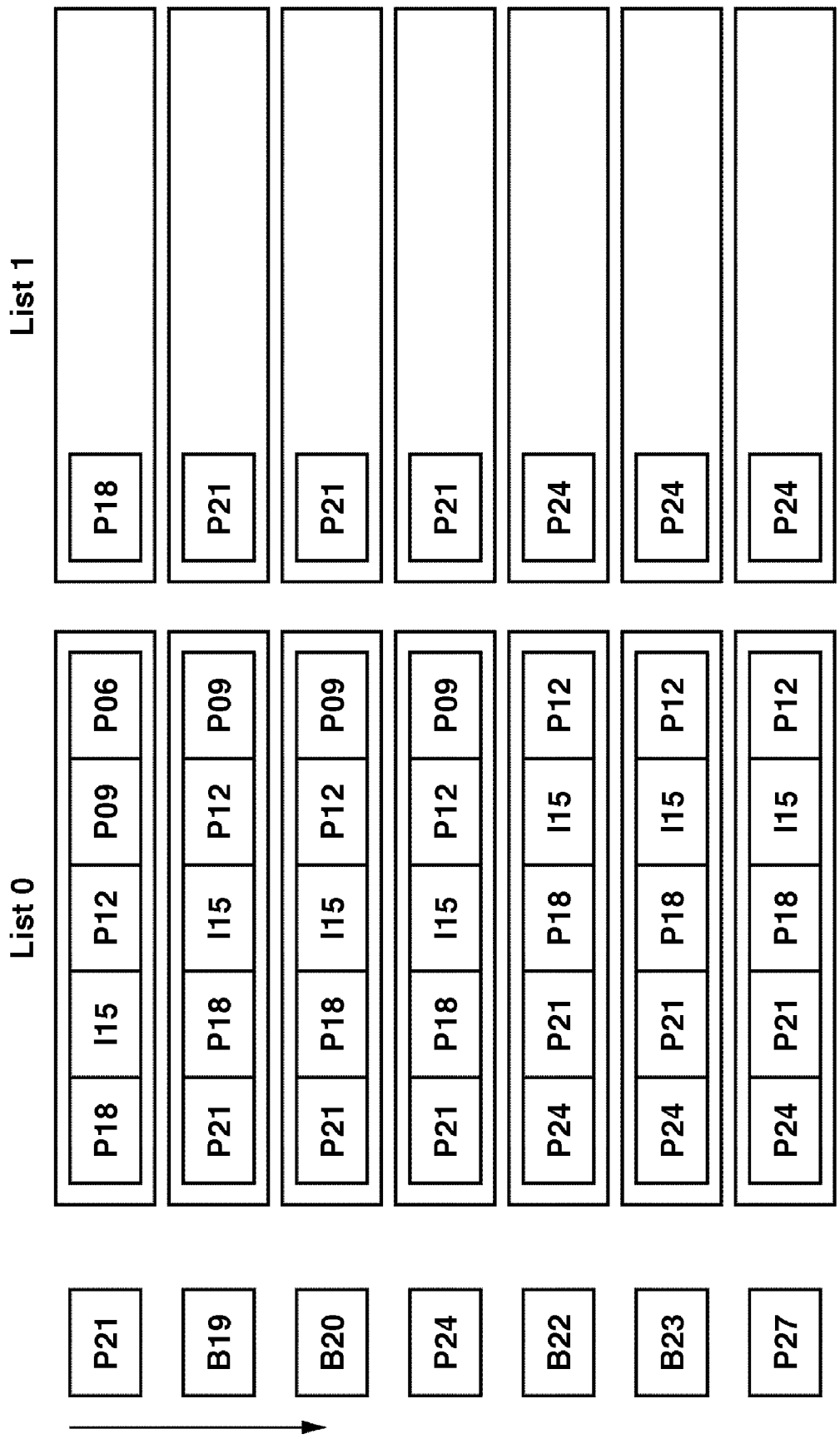
FIG. 4 illustrates a changing state of the reference list for each picture.
Figure 5:
FIG. 5 illustrates a changing state of the reference list when a B picture is added to the reference list.
Figure 7A:
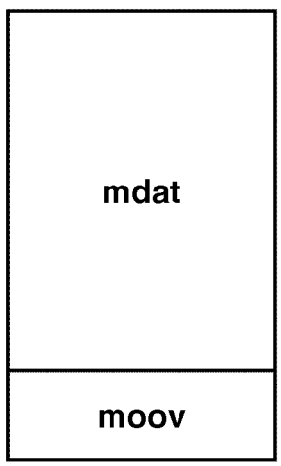
FIGS. 7A to 7C illustrate configuration examples of the MP4 file.
Figure 7B:
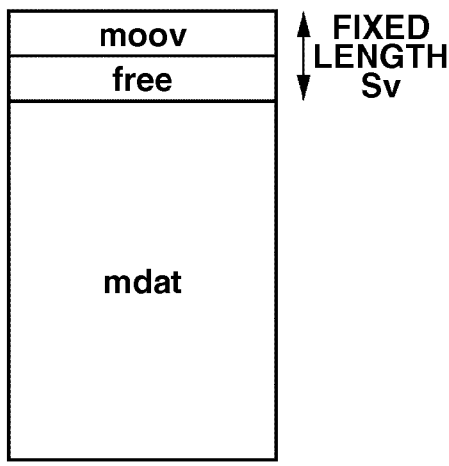
Figure 7C:
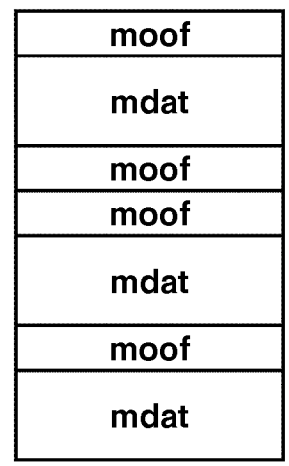
Figure 8:
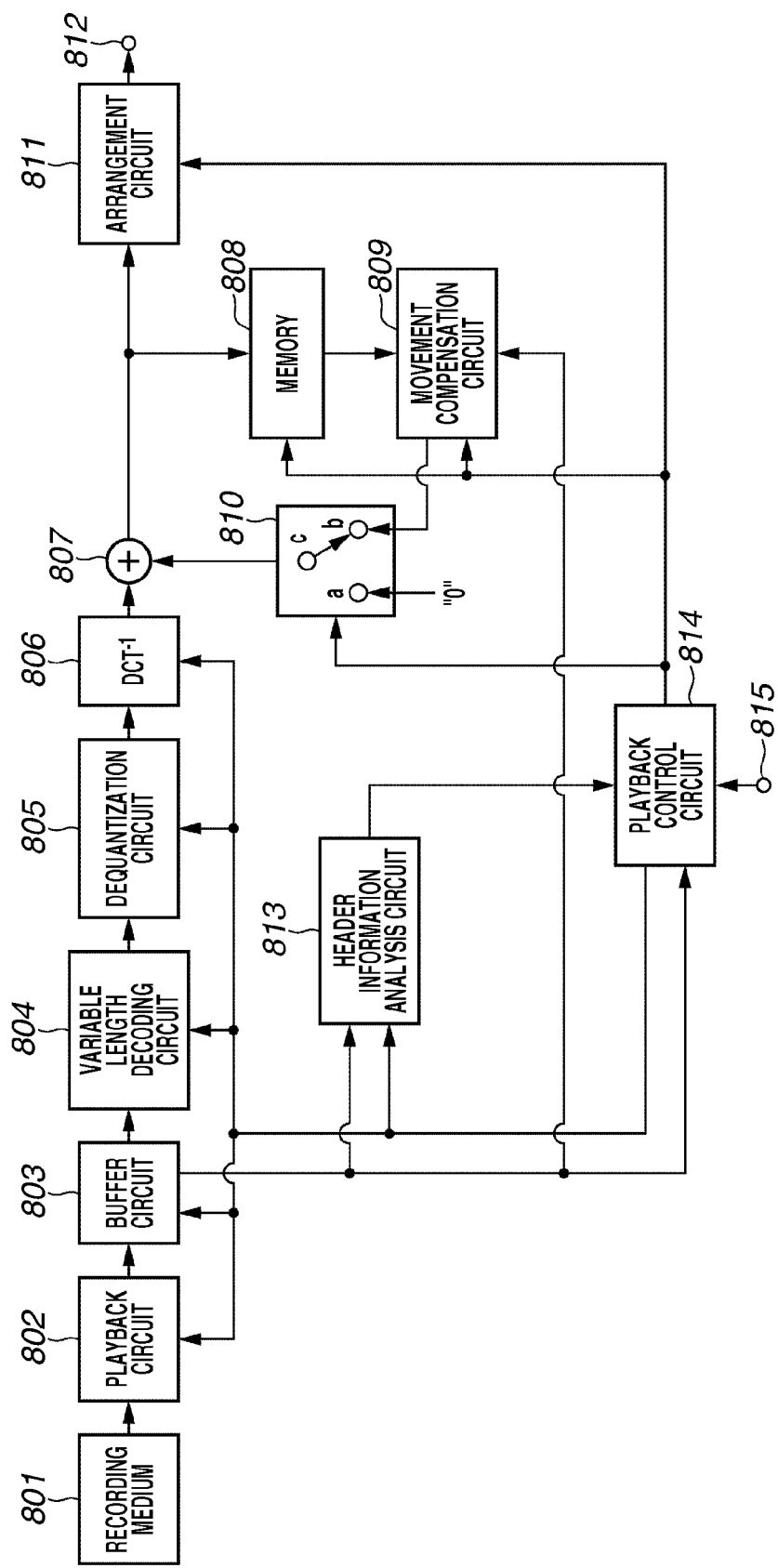
FIG. 8 is a block diagram illustrating a conventional playback circuit.
Figure 9:
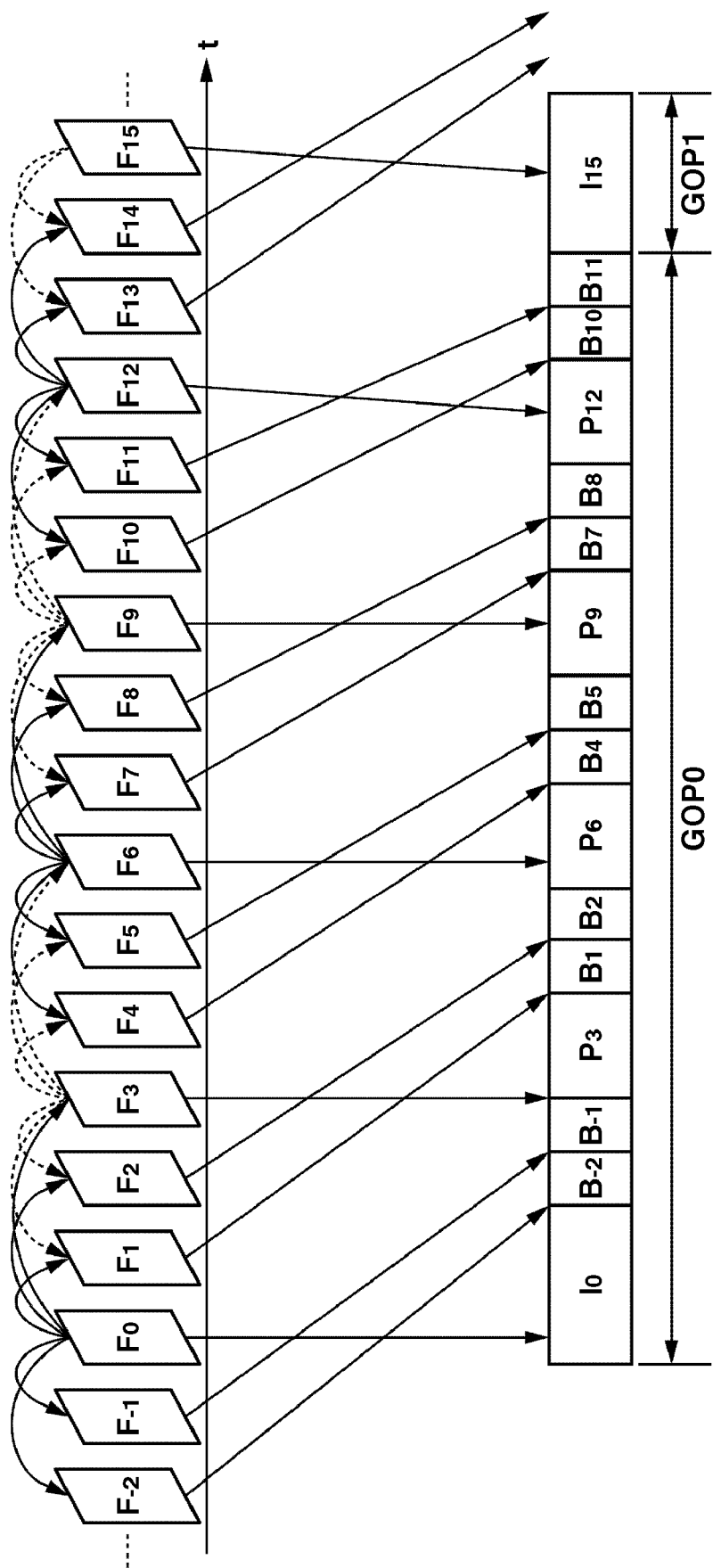
FIG. 9 illustrates a coding frame order.
Figure 10:
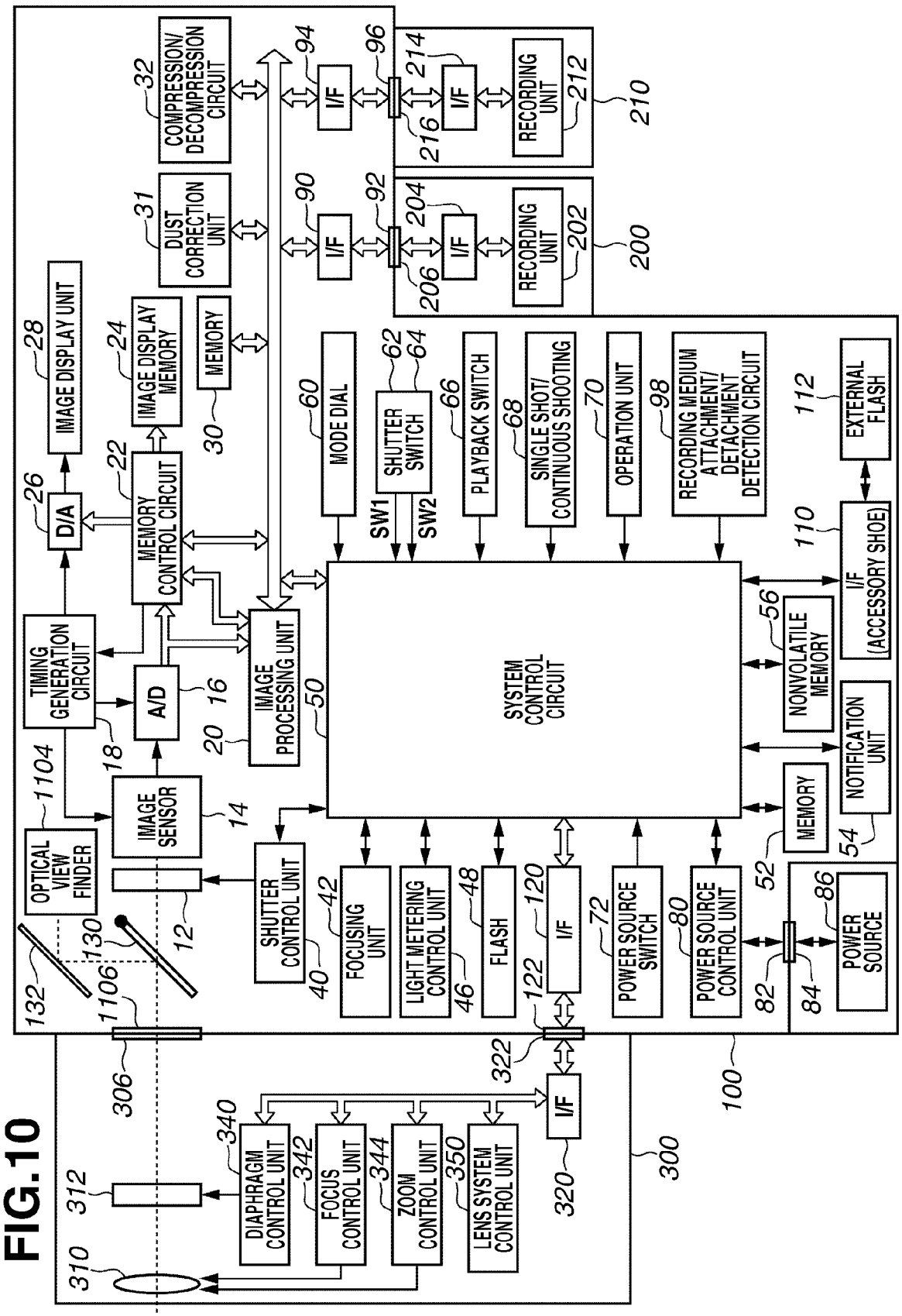
FIG. 10 is a block diagram illustrating a configuration of an imaging apparatus which is common to each exemplary embodiment in the present invention.

As illustrated in FIG. 10, the imaging apparatus according to the present exemplary embodiment is mainly configured by a camera body 100 and an interchangeable lens unit 300.

The lens unit 300 includes an imaging lens 310 including a plurality of lenses, a diaphragm 312, and a lens mount 306 for mechanically mounting the lens unit 300 to the camera body 100. Various functions for electrically connecting the lens unit 300 with the camera body 100 are included in the lens mount 306.

The lens mount 306 includes an interface 320 for connecting the lens unit 300 with the camera body 100, and a connector 322 for electrically connecting the lens unit 300 with the camera body 100.

The connector 322 also includes a function of exchanging control signals, status signals, and data signals between the camera body 100 and lens unit 300, and supplying currents of various voltages. The connector 322 may perform, for example, optical communication, audio communication other than the electrical communication.

A diaphragm control unit 340 controls the diaphragm 312 based on photometric information from a light metering control unit 46 in cooperation with a shutter control unit 40 which controls a shutter 12 of the camera body 100. A focus control unit 342 controls focusing of the imaging lens 310. A zoom control unit 344 controls zooming of the imaging lens 310.

A lens system control unit 350 controls the whole lens unit 300. The lens system control unit 350 includes a memory for storing constants, variables, programs, and the like for operation of the lens. The lens control unit 350 also includes a nonvolatile memory for storing identification information such as a number or the like unique to the lens unit 300, management information, function information such as a full-aperture value, a minimum aperture value, a focal length and the like, and past and present setting values.

Next, the configuration of the camera body 100 will be described. The camera body 100 includes a lens mount 1106 for mechanically coupling the camera body 100 with the lens unit 300, and mirrors 130 and 132 for guiding a light incident on the imaging lens 310 to an optical viewfinder 1104 by a single-lens reflex system. The mirror 130 may either be a quick turn mirror or a half mirror.

The camera body 100 further includes a shutter 12 and an imaging sensor 14 for converting a target image into an electrical signal. The light incident on the imaging lens 310 is guided by the single-lens reflex system via the diaphragm 312 (i.e., a light amount control unit), the lens mounts 306 and 1106, the mirror 130, and the shutter 12 to form an image on the imaging sensor 14 as an optical image.

The camera body 100 includes an A/D converter 16 for converting an analog signal output from the imaging sensor 14 into a digital signal, and a timing generation circuit 18 for supplying clock signals and control signals respectively to the imaging sensor 14, the A/D converter 16, and a D/A converter 26. The timing generation circuit 18 is controlled by a memory control circuit 22 and a system control circuit 50.

An image processing circuit 20 performs predetermined pixel interpolation processing and color conversion processing on data from the A/D converter 16 or data from the memory control circuit 22. The image processing circuit 20 performs predetermined calculation processing using image data output from the A/D converter 16 as needed.

The image processing circuit 20 can perform various processing such as processing for controlling the shutter control unit 40 and through-the-lens (TTL) type auto-focus (AF) processing for controlling a focusing unit 42, automatic exposure (AE) processing, and flash preliminary emission (EF) processing. The system controller 50 performs controlling them based on the processed result performed by the image processing circuit 20.

The image processing circuit 20 also performs predetermined calculation processing using the image data output from the A/D converter 16, and performs TTL type auto white balance (AWB) processing based on the obtained calculation result.

In the example illustrated in FIG. 10, the system includes the focusing unit 42 and the light metering control unit 46. Therefore, the AF processing, AE processing, and EF processing may respectively be performed using the focusing unit 42 and the light metering control unit 46, without performing such processing using the image processing circuit 20.

Further, the AF processing, AE processing, and EF processing may respectively be performed using the focusing unit 42 and the light metering control unit 46, in addition to the processing using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32.

Image data output from the A/D converter 16 is written in the image display memory 24 or the memory 30 via the image processing circuit 20 and the memory control circuit 22, or only via the memory control circuit 22.

Display image data written in the image display memory 24 is displayed by an image display unit 28 formed with thin film transistor liquid crystal device (TFT-LCD), via the D/A converter 26. By using the image display unit 28 to sequentially display the captured image data, an electronic viewfinder function (EVF) can be realized.

The image display unit 28 can arbitrarily turn on/off its display by an instruction from the system control circuit 50. When the display is turned off, the power consumption of the camera body 100 can be substantially reduced.

As a result, even when performing panorama shooting or continuous shooting for continuously capturing a plurality of still images, a large number of images can be written in the memory 30 at a high speed. The memory 30 has a sufficient storage capacity to store a predetermined number of still images. Further, the memory 30 can be used as a work area of the system control circuit 50.

A dust correction circuit 31 corrects a dust shadow contained in the image data using the dust information stored in a nonvolatile memory 56 and the optical data obtained from the lens unit 300.

The compression/decompression circuit 32 compresses/decompresses the image data using a known compression method. The compression/decompression circuit 32 reads an image stored in the memory 30, performs compression processing or decompression processing, and rewrites the compressed or decompressed data in the memory 30.

The shutter control unit 40 controls the shutter 12 based on photometric information from the light metering control unit 46 in cooperation with the diaphragm control unit 340 that controls the diaphragm 312.

The focusing unit 42 performs auto-focus (AF) processing. An in-focus state of the image formed as an optical image is measured using the image obtained by causing a light, which was incident on the imaging lens 310 in the lens unit 300, to enter by the single-lens reflex system via the lens mounts 306 and 1106, the mirror 130, and a focusing sub-mirror (not illustrated).

The light metering control unit 46 performs the automatic exposure (AE) processing. An exposure state of the image formed as an optical image is measured using the light obtained by causing a light, which is incident on the imaging lens 310 in the lens unit 300, to enter by the single-lens reflex system via the lens mounts 306 and 1106, the mirror 130, and a light metering sub-mirror (not illustrated).

A flash unit 48 has a function of projecting AF auxiliary light and a flash light amount control function. The light metering control unit 46 also has an EF (flash light amount control) processing function by cooperating with the flash unit 48.

Further, the AF control may also be performed using the measurement result from the focusing unit 42 and the calculation result obtained by performing a calculation on the image data output from the A/D converter 16 by the image processing circuit 20. Moreover, the exposure control may also be performed using the measurement result by the light metering control unit 46 and the calculation result obtained by performing a calculation on the image data output from the A/D converter 16 by the image processing circuit 20.

The system control circuit 50 controls the whole camera body 100. The system control circuit 50 includes a known CPU and the like. A memory 52 stores constants, variables, programs, and the like for operating the system control circuit 50.

A notification unit 54 performs external notification and sends messages about the operation state and the like using characters, images, sounds based on execution of a program by the system control circuit 50. Examples of the notification unit 54 include a display unit performing visual display by an LCD, light-emitting diode (LED) and the like, and a sound generation device that performs notification by sound. The notification unit 54 is configured by combining one or more of these examples.

Especially in the case of the display unit, the notification unit 54 is arranged at one or more easy-to-see positions around an operation unit 70 of the camera body 100. Further, some of its functions of the notification unit 54 are provided in the optical viewfinder 1104.

Among the display contents for the notification unit 54, the following examples are displayed on the image display unit 28 such as the LCD.

First, such display examples include a single shot/continuous shooting indication, a self timer indication, and an imaging mode. Further display examples include displays relating to recording, such as a compression ratio indication, a recording pixel number indication, a recorded image number indication, a residual shot number indication and the like.

In addition, display examples include displays relating to shooting conditions, such as a shutter speed indication, an aperture value indication, an exposure correction indication, a light emission amount control correction indication, an emission amount of an external flash indication, a red-eye reduction indication and the like.

Further display examples also include a macro shooting indication, a buzzer setting indication, a remaining battery capacity indication, an error indication, an information display using numerals of a plurality of digits, and an attachment/detachment state indication of recording media 200 and PC 210.

Still further examples include an attachment/detachment indication of the lens unit 300, a communication I/F operation indication, a date/time indication, an indication illustrating a connection state with an external computer and the like.

Examples of the display contents of the notification unit 54 further include the following as contents displayed in the optical viewfinder 1104.

Such display examples include an in-focus indication, a shooting preparation completion indication, a camera-shake warning indication, a flash charging indication, a flash charging completion indication, the shutter speed indication, the aperture value indication, the exposure correction indication, and a recording medium write access indication.

The nonvolatile memory 56 (e.g. electrically erasable programmable read only memory (EEPROM)) is electrically erasable/programmable and stores a program and the like.

Operation units 60, 62, 64, 66, 68, and 70 are used for inputting various operation instructions of the system control circuit 50. The operation units 60, 62, 64, 66, 68, and 70 are configured by one or more combinations of a switch, a dial, a touch panel, pointing by line-of-sight detection, a voice recognition apparatus and the like.

These operation units will be described in more detail below.

A mode dial switch 60 can select and set various shooting modes, such as an automatic shooting mode, a program shooting mode, a shutter speed priority shooting mode, an aperture priority shooting mode, a manual shooting mode, and a focal depth priority (depth) shooting mode.

Further examples of such various shooting modes which the mode dial switch 60 can select and set include a portrait shooting mode, a landscape shooting mode, a close-up shooting mode, a sport shooting mode, a night scene shooting mode, a panorama shooting mode and the like. Switching to a moving image shooting mode, which is a characteristic of the present exemplary embodiment, can also be performed by this mode dial.

A shutter switch 62 (SW1) is turned on in the middle of operation (e.g., a half press) of a shutter button (not illustrated), and the shutter switch 62 (SW1) instructs the AF processing, AE processing, AWB processing, EF processing and the like to start operating.

A shutter switch 64 (SW2) is turned on upon completion of operation of the shutter button (e.g., full press). The shutter switch 64 (SW2) instructs a series of processes including exposure processing, development processing, and recording processing to start operating.

First, in exposure processing, a signal read out from the imaging sensor 14 is written into the memory 30 via the A/D converter 16 and the memory control circuit 22. Then, development processing using calculation results performed in the image processing circuit 20 and the memory control circuit 22 is performed.

Further, in the recording processing, image data from the memory 30 is read out, the read out image data is compressed by the compression/decompression circuit 32, and the compressed image data is written into, or sent to, the recording medium 200 or PC 210.

The playback switch 66 instructs a playback operation to start. In this playback operation, an image captured in a shooting mode state is read out from the memory 30 or the recording medium 200 or PC 210, and displayed on the image display unit 28. Various function modes may also be set, such as a playback mode, a multiple-screen playback/erasing mode, a PC connection mode and the like.

The single shot/continuous shooting switch 68 can set either a single shot mode for shooting one frame when the shutter switch 64 (SW2) is pressed and then transferring to a standby state, or a continuous shooting mode for continuously capturing images while the shutter switch 64 (SW2) is held down.

The operation unit 70 includes various buttons, a touch panel and the like. Examples thereof include a live view start/stop button, a menu button, a set button, a multiple-screen playback and page advance button, a flash setting button, and a single shooting/continuous shooting/self timer switch button, a menu move + (plus) button, and a menu move − (minus) button.

The operation unit 70 may also include a playback image move + (plus) button, a playback image move − (minus) button, a captured image quality selection button, an exposure correction button, a light amount control correction button, an emission amount of an external flash setting button, a date/time setting button and the like.

The various functions of the plus buttons and minus buttons may also be set by using a rotary dial switch so that the numerical values and settings can be selected more easily.

The operation unit 70 further includes an image display ON/OFF switch for turning the image display unit 28 on and off, and a quick review ON/OFF switch for setting a quick review function of automatically playing back captured image data immediately after being captured.

The operation unit 70 also includes a compression mode switch for selecting a compression ratio of JPEG compression, or selecting a RAW mode for directly converting a signal from the imaging sensor into digital data and recording the digital data in a recording medium.

The operation unit 70 also includes an AF mode setting switch which can set a one-shot AF mode and a servo AF mode. In the one-shot AF mode, the auto-focus operation is started when the shutter switch 62 (SW1) is depressed, and once an in-focus state is obtained, the in-focus state is maintained.

In the servo AF mode, the servo AF operation is continued while the shutter switch 62 (SW1) is held down. Further, as described below, the operation unit 70 includes a setting switch capable of setting a dust information acquisition mode for acquiring dust information by capturing a dust detection image.

A power source switch 72 can switch between power-on and power-off modes of the camera body 100. The power source switch 72 can also switch between the power-on and power-off modes of various accessories such as the lens unit 300, an external flash 112, recording media 200 and PC 210 and the like, which are connected to the camera body 100.

A power source control unit 80 includes a battery detection circuit, a DC-DC converter, a switch circuit for switching a block to be energized and the like. The power source control unit 80 detects the presence, the type, and the remaining capacity of a mounted battery, then controls the DC-DC converter based on the detection results and an instruction from the system control circuit 50, and supplies a required voltage to the respective units including the recording media for a required period of time.

A power source 88 include a primary battery such as an alkali battery and a lithium battery, a secondary battery such as a nickel-cadmium (NiCd) battery, a nickel-metal hydride (NiMH) battery, and a lithium-ion (Li-ion) battery, and an AC adaptor. Connectors 82 and 84 connect the power source 86 and the power source control unit 80.

Interfaces (I/F) 90 and 94 are interfaces between a recording medium, such as a memory card and a hard disk, or a PC and electrical circuits in the camera body 100. Connectors 92 and 96 connect the camera body 100 and the recording medium, such as a memory card and a hard disk, or the PC. A recording medium attachment/detachment detection circuit 98 detects whether the recording medium 200 or PC 210 is attached to the connector 92 and/or the connector 96.

Although the present exemplary embodiment is described as having two sets of interfaces and connectors for attaching the recording medium, one or a plurality of sets of interfaces and connectors may be used. Further, a combination of interfaces and connectors of different standards may also be used.

Interfaces and connectors complying with the standards of various storage media may be used. For example, a Personal Computer Memory Card International Association (PCM-CIA) card, a CompactFlash® (CF) card, a secure digital (SD) card and the like can be used.

If interfaces and connectors which comply with the standards of a PCMCIA card or a CF card are used for the interfaces 90 and 94 and the connectors 92 and 96, various communication cards can be connected.

Examples of the communication cards include a Local Area Network (LAN) card, a Universal Serial Bus (USB) card, an Institute of Electrical and Electronic Engineers (IEEE) 1394 card, a P1284 card, a Small Computer System Interface (SCSI) card, a PHS (Personal Handy-phone System) and the like. By connecting these various communication cards, image data and management information associated with the image data can be transferred to and from another computer or peripheral devices such as a printer.

The optical viewfinder 1104 can guide a light that is incident on the imaging lens 310 by the single-lens reflex system via the diaphragm 312, the lens mounts 306 and 1106, and the mirrors 130 and 132, form an image as an optical image, and display that image.

As a result, without using the electronic viewfinder function performed by the image display unit 28, imaging can be performed using just the optical viewfinder 1104. Further, some functions of the notification unit 54 can be displayed in the optical viewfinder 1104, such as the in-focus state, the camera-shake warning, the flash charging, the shutter speed, the aperture value, the exposure correction and the like.

The external flash apparatus 112 is attached via an accessory shoe 110. An interface 120 connects the camera body 100 and the lens unit 300 using the lens mount 1106. A connector 122 electrically connects the camera body 100 and the lens unit 300.

Further, whether the lens unit 300 is mounted on the lens mount 1106 and the connector 122 is detected by a lens attachment/detachment detection unit (not illustrated).

The connector 122 also has a function of exchanging control signals, status signals, data signals and the like between the camera body 100 and the lens unit 300, and supplying currents of various voltages. In addition, the connector 122 may transmit optical communication, audio communication, and the like other than the electrical communication.

The recording medium 200, such as a memory card or a hard disk, includes a recording unit 202 (e.g., semiconductor memory), a magnetic disk or the like, an interface 204 with the camera body 100, and a connector 206 for connecting with the camera body 100.

Examples of the recording medium 200 include a memory card such as PCMCIA card and CompactFlash® card, a hard disk, a micro digital audio tape-recorded (DAT), a magneto-optical disk, an optical disk such as a Compact Disc Recordable (CD-R) and a Compact Disc ReWritable (CD-RW), and a phase change optical disk such as a DVD.

The PC 210 includes a recording unit 212 including a magnetic disk (HD) and the like, an interface 214 for the camera body 100, and a connector 216 for connecting with the camera body 100. Although the interfaces 94 and 214 include a USB and IEEE 1394, they are not limited to these devices.

Next, the playback processing, which performs playback while correcting the effects of dust on an optical member, such as a low-pass filter or a cover glass, arranged on the front face of the imaging sensor in the imaging apparatus described above, will be described.

In the present exemplary embodiment, first, a dust detection image (still image) for obtaining dust information (foreign substance information) is captured, and dust data is extracted. Moving image playback is performed while performing dust correction by a PC and the like by adding this dust data to the normal images (moving images) which are subsequently captured.

The dust detection image is desirably a captured image of a surface having a luminance that is as uniform as possible. However, because it is desirable that this dust detection image can be easily captured at a nearby location, strict uniformity is not required. Examples may include capturing a blue sky or a white wall surface. Here, the operations for an MP4 file format, which is mainly a moving image file, will be described in detail.

Figure 11:
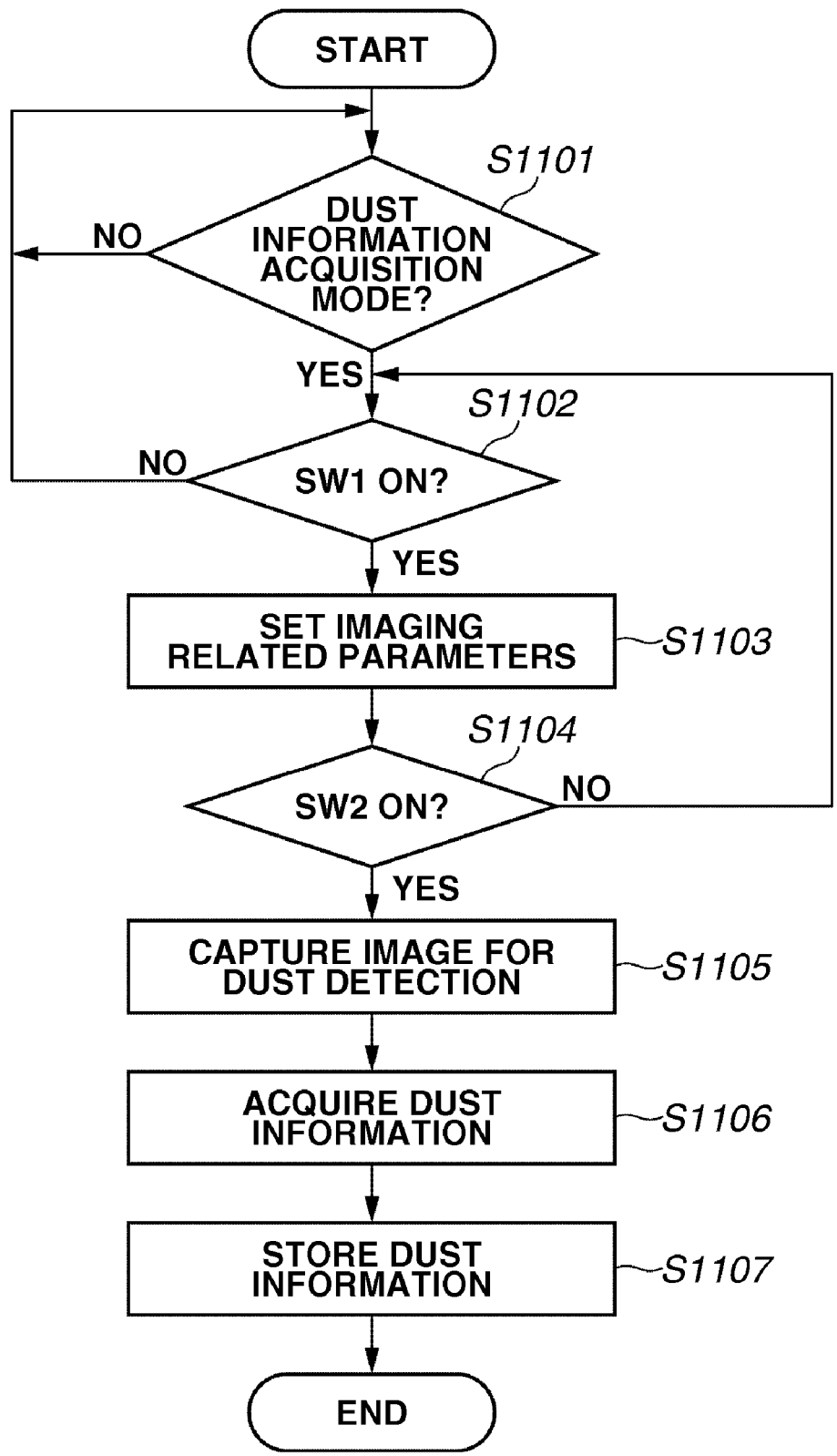
FIG. 11 is a flowchart illustrating processing in the imaging apparatus when acquiring dust information.

FIG. 11 is a flowchart illustrating processing in the imaging apparatus when acquiring dust information according to the present exemplary embodiment.

First, in step S1101, it is determined whether a dust acquisition mode is selected by the operation unit 70. The determination of step S1101 is repeated until the dust acquisition mode is selected. When the dust acquisition mode is selected (YES in step S1101), the processing proceeds to step S1102. In step S1102, it is determined whether the shutter switch 62 (SW1) is turned ON. If the shutter switch 62 (SW1) is turned OFF (NO in step S1102), the processing returns to step S1101, and the above processing is repeated.

Figures 12, 13:
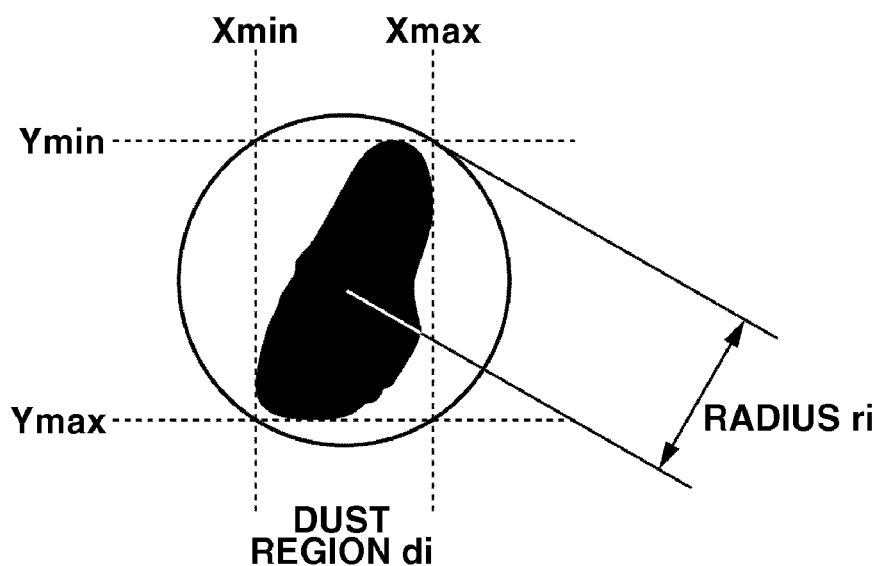
FIG. 12 is a table illustrating a setting example of imaging related parameters when acquiring dust information.
FIG. 13 illustrates an outline of a dust region size calculation.

On the other hand, if the shutter switch 62 (SW1) is turned ON (YES in step S1102), the processing proceeds to step S1103. In step S1103, the diaphragm, ISO value, shutter speed, and other imaging related parameters are set. The parameters that are set in step S1103 are illustrated in FIG. 12.

The diaphragm is set to a reduced aperture, such as F22. The image capturing may also be performed at the most reduced aperture within the range that can be set in the lens unit 300 attached to the lens mount 1106.

Reducing the aperture like this is carried out for the following reason. Namely, the dust normally adheres to a protective glass protecting the imaging sensor 14 or to the optical filter 1104 arranged on a target object side of the imaging sensor 14, rather than the surface of the imaging sensor 14. Thus, the state of the formed image is different depending on the aperture value of the lens unit 300. As a result, the image becomes blurrier the closer the aperture is to a full-aperture value, which means that a suitable image for the dust detection cannot be obtained. Thus, it is preferable to perform imaging in a state with a reduced aperture as small as possible.

Returning to the flowchart of FIG. 11, by this time the photographer has captured the image of a surface with a uniform luminance, such as a white wall, by operating the shutter switch 64 (SW2).

In step S1104, it is determined whether the shutter switch 64 (SW2) is turned ON. If the shutter switch 64 (SW2) is turned OFF (NO in step S1104), the processing returns to step S1102, and the shutter switch 62 (SW1) determination is performed.

If the shutter switch 64 (SW2) is turned ON (YES in step S1104), the processing proceeds to step S1105. In step S1105, the dust detection image (surface with uniform luminance) is captured, and the captured image data is input in the memory 30. Next, in step S1106, dust information is acquired from the image data stored in the memory 30.

Acquisition of the dust information will now be described. Specifically, in this processing, a position (coordinates) and size of a dust region are determined from the captured dust detection image. First, a captured dust detection image region is divided into a plurality of blocks. Maximum luminance "Lmax" and average luminance "Lave" of the blocks are calculated, and a threshold value T1 in the blocks is calculated using the following equation.

$$T1 = \text{``Lave''} \times 0.6 + \text{``Lmax''} \times 0.4$$

Next, pixels which do not exceed the threshold value T1 are determined to be dust pixels. Each isolated region constituted of dust pixel (s) is determined to be a single dust region di (i=0, 1, . . . , n).

FIG. 13 illustrates an outline of the dust region size calculation. As illustrated in FIG. 13, for each dust region, a maximum value "Xmax" and a minimum value "Xmin" of the horizontal direction coordinate constituting the dust region, and a maximum value "Ymax" and a minimum value "Ymin" of the vertical direction coordinate constituting the dust region are determined, and a radius "ri" representing the size of the dust region "di" is calculated by the following equation.

$$ri = [\sqrt{\{(Xmax - Xmin)^2 + (Ymax - Ymin)^2\}}]/2$$

The center coordinates (Xdi, Ydi) at this point can be approximated as follows.

$$Xdi = (Xmax + Xmin)/2$$

$$Ydi = (Ymax + Ymin)/2$$

The thus-determined position (coordinates) and radius are recorded as a dust information profile.

This dust region profile has a configuration as illustrated in FIG. 14. As illustrated in FIG. 14, lens information and information on the position and size of the dust when the dust detection image was captured are stored in the dust information profile.

More specifically, the actual aperture value (F value) of when the dust detection image was captured and the lens pupil position at that time are stored as lens information for when the dust detection image was captured. Next, the number (an integer) of detected dust regions is stored in a storage region. Then, each of the specific dust region parameters is stored by repeating the processing for the number of dust regions.

The dust region parameters are three sets of integers, of the dust radius (e.g., 2 bytes), the center x coordinate of the subject image region (e.g., 2 bytes), and the center y coordinate of the subject image region (e.g., 2 bytes).

In step S1107, the acquired dust information (dust information profile) is stored in the nonvolatile memory 56, and then the processing for acquiring the dust information ends.

The reason for storing the dust information in the nonvolatile memory 56 is that, once the dust information is acquired, the dust information is continuously added to the image data (moving image data) obtained by the capturing performed until the next dust information is acquired. Therefore, if the dust information is acquired by the user each time the power source is turned on, the dust information does not have to be stored in a nonvolatile memory.

When capturing a moving image with the imaging apparatus of the present exemplary embodiment, since a moving image file of the above-described MP4 is used, the dust information profile temporarily stored in the nonvolatile memory 56 is stored in the "mvhd box" constituted by header information in the "moov box" of the moving image data, or in the "mvhd box" in the "moof box" of the moving image data.

Next, a flow of the dust correction playback processing will be described. A case will be described for when the dust correction playback processing is performed by a separately-provided image processing apparatus rather than in the digital camera body below.

Figure 15:
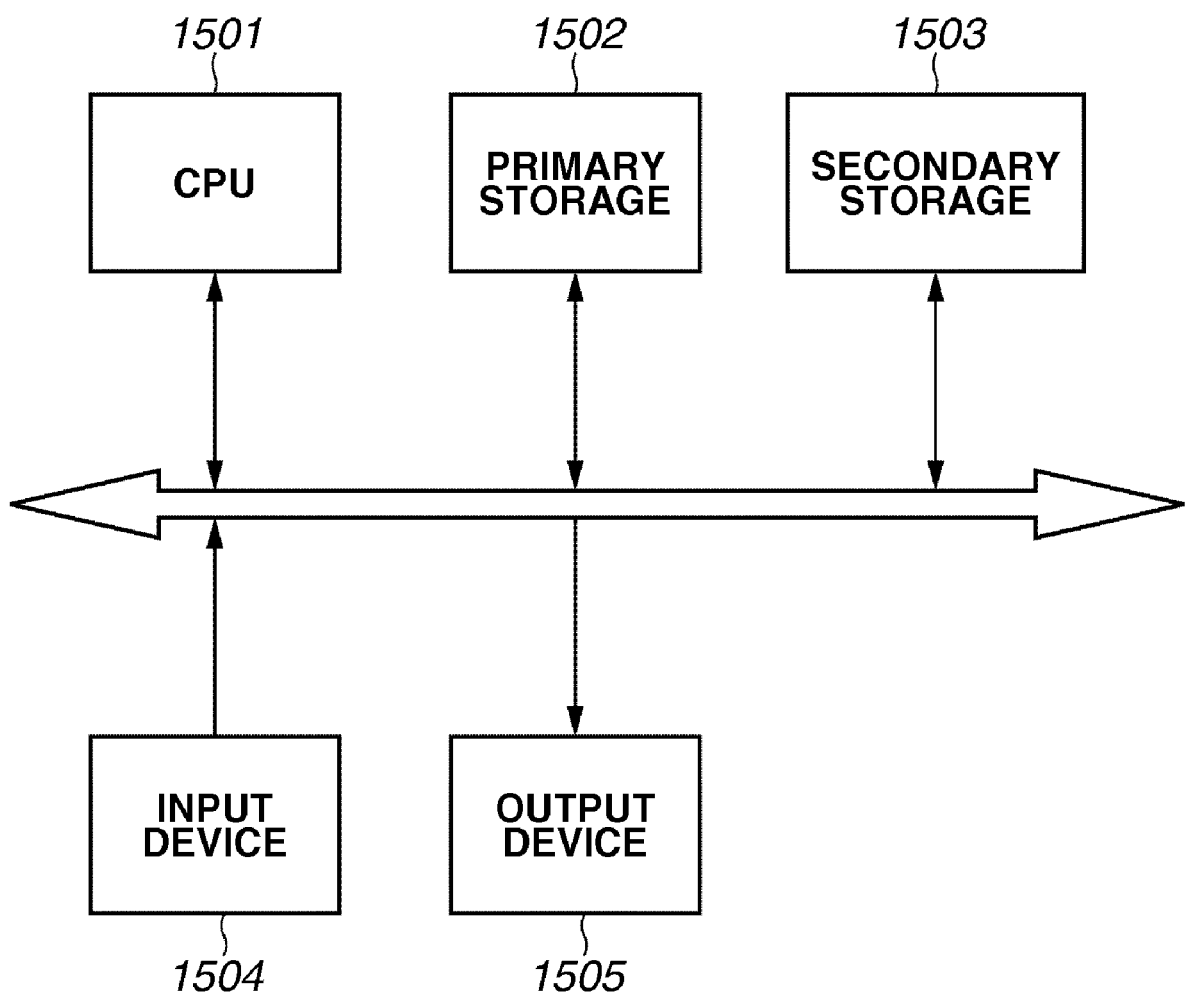
FIG. 15 is a block diagram illustrating an outline of a system configuration of the image processing apparatus.

FIG. 15 is a block diagram illustrating an outline of a system configuration of the image processing apparatus. A central processing unit (CPU) 1501 controls the operations of the whole system, and performs execution of a program stored in a primary storage unit 1502 and the like. The primary storage unit 1502 is mainly a memory that reads and stores programs stored in a secondary storage unit 1503.

Examples of the secondary storage unit 1503 include a hard disk. Generally, the capacity of the primary storage unit is smaller than the capacity of the secondary storage unit. Programs and data that cannot be stored in the primary storage unit are stored in the secondary storage unit. Further, data and the like which has to be stored for a long period of time is also stored in the secondary storage unit.

In the present exemplary embodiment, a program is stored in the secondary storage unit 1503, is read into the primary storage unit 1502 during program execution, and the CPU 1501 performs execution processing.

An input device 1504 may be a mouse or a keyboard used to control the system. Further examples include a card reader, scanner, film scanner, which are required for the input of image data.

Examples of an output device include a monitor, a printer. While various other configurations may be used for this apparatus, they are beyond the focus of the present invention, and the description thereof is omitted here.

An operating system capable of parallel execution of a plurality of programs is loaded in the image processing apparatus. The user can operate the program to be run on this apparatus by using a GUI.

Figure 16:
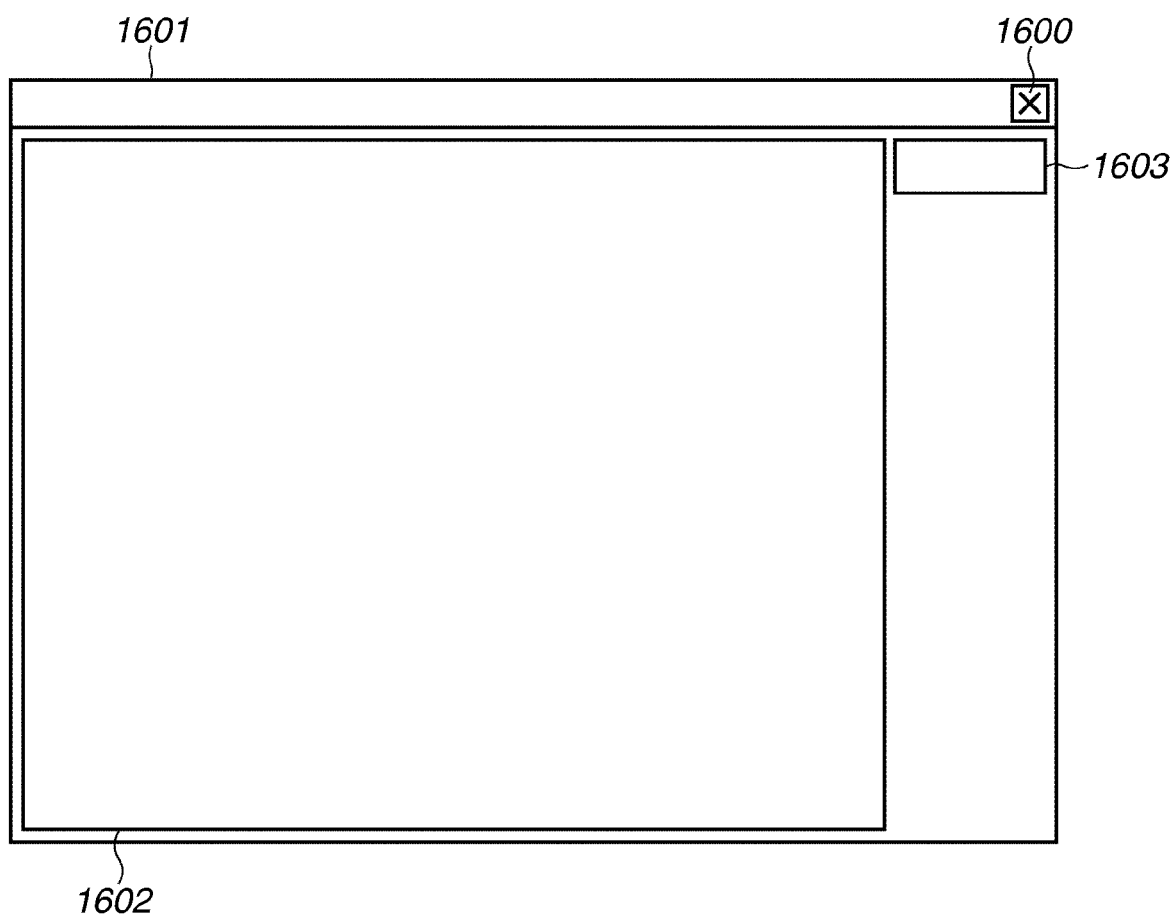
FIG. 16 illustrates an example Graphical User Interface (GUI) in the image processing apparatus.

FIG. 16 illustrates the GUI of an image editing program in the image processing apparatus. A close button 1600 and a title bar 1601 are included in a window. By clicking the close button, the program is finished.

When a correction playback target image is designated by dragging and dropping the file into an image display region 1602 to determine the correction playback target image, the file name is displayed in the title bar 1601, and then the target image is displayed so as to fit in the image display region 1602. If a correction playback execution button 1603 is clicked, dust correction playback processing is executed, and the resultant image is displayed in the image display region 1602.

Figure 17:
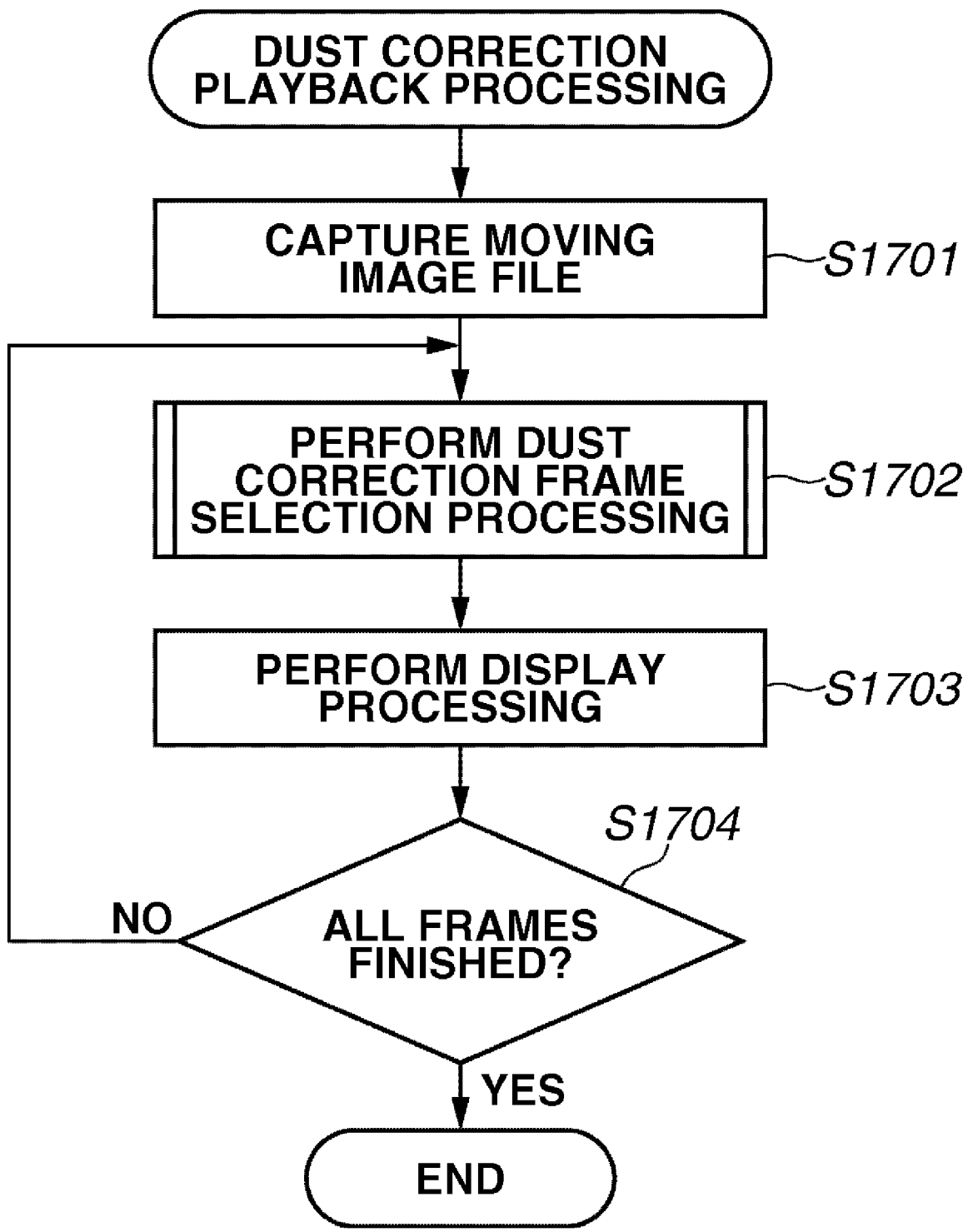
FIG. 17 is a flowchart illustrating dust correction playback processing.

FIG. 17 illustrates a flow of the dust correction playback processing in the image processing apparatus.

First, in step S1701, a moving image file to which dust position correction data was added, which is read out from the digital camera or the recording medium 200 removed from the digital camera, is loaded into the image processing apparatus, and stored in the primary storage unit 1502 or the secondary storage unit 1503.

Next, in step S1702, dust correction frame selection processing for selecting the frame on which dust correction playback processing is to be performed from among each video sample (frame) of the moving image displayed on the image display region 1602 from the moving image file is performed. This dust correction frame selection processing will be described below referring to FIG. 18.

Next, in step S1703, display processing is performed. Display processing is processing in which the image is displayed on the image display region 1602. This processing is a known technology that was already described above in the background art, and thus a detailed description thereof will be omitted here.

Next, in step S1704, it is determined whether the processing of all of the frames is finished. If it is determined that the processing of all of the frames is finished (YES in step S1704), the dust correction playback processing ends. If the processing of all of the frames is not finished (NO in step S1704), then, the processing returns to the dust correction frame selection processing, and the above steps are repeated until the processing of all of the frames is finished. As described above, the dust correction playback processing is performed.

Figure 18:
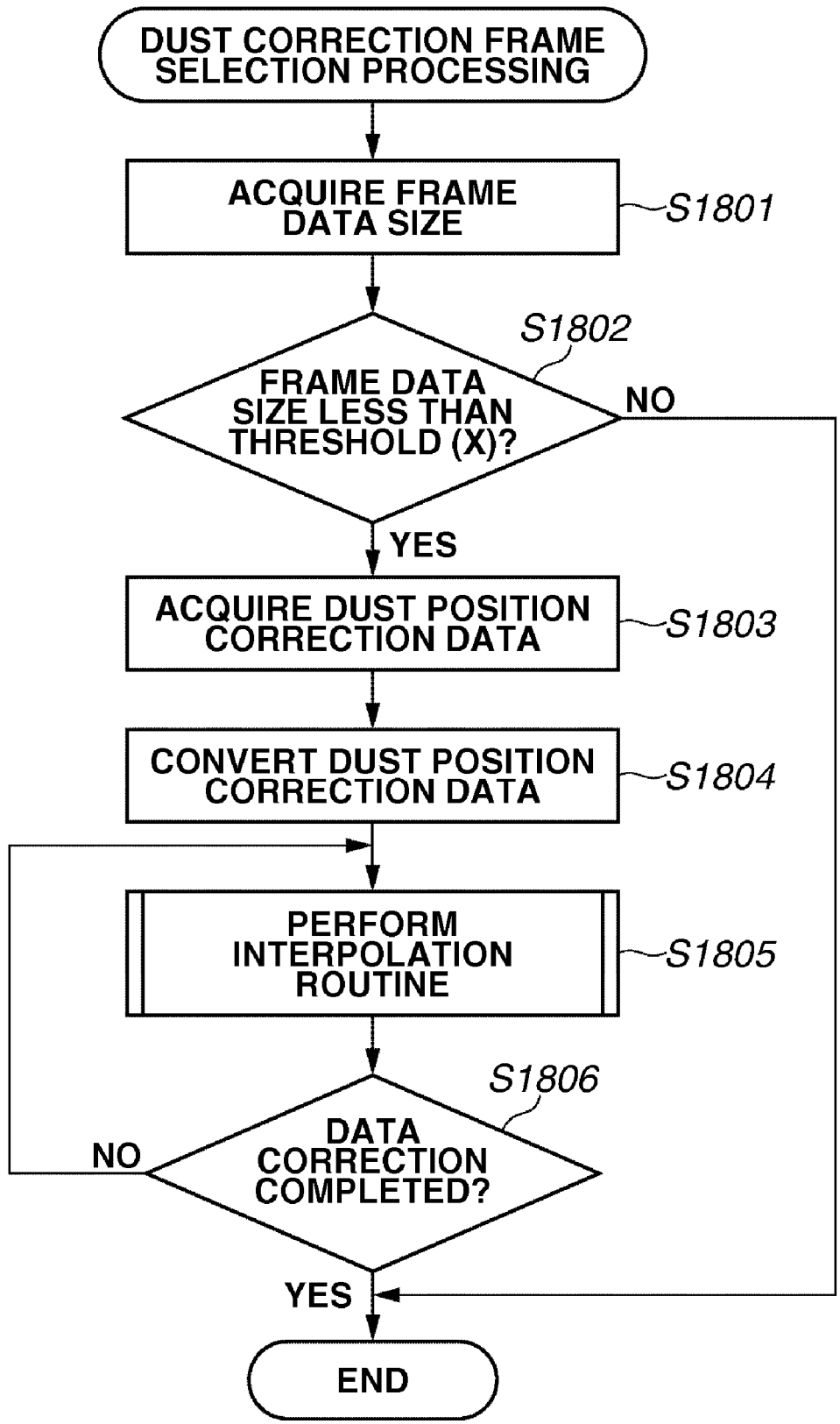
FIG. 18 is a flowchart illustrating details of dust correction frame selection processing.

FIG. 18 illustrates a flow of the above-described dust correction frame selection processing. First, in step S1801, frame data size information for each sample is obtained from the "stsz box" in the trak box that is in the "moov box" or the "moof box" containing the selected frame.

Next, in step S1802, it is determined whether the frame data size acquired in step S1801 is less than a predetermined threshold (X). This threshold (X) may be determined statically, or selected dynamically based on the playback operation environment. Obviously, this threshold value may also be determined by the user.

Usually, for an image processing apparatus which compresses image data in the above-described H.264 format, the frame data size of a comparatively uniform moving image, such as of a blue sky or a white wall surface, is small.

This is because difference image data and the optimum movement vector are determined using a prediction image during the coding of each frame. This movement vector is determined based on the results of movement detection using the image data from different frames. The movement vector is entropy coded for each frame along with the difference image data. Further, the output bit stream is formed using a plurality of pieces of the coded frame data. Therefore, it can also be determined that movement of the image becomes larger and more rapid, the larger the data size of the frame data becomes. Namely, the threshold (X) can be said to be a number that serves as a measure of the magnitude of movement between frames.

Further, if there is a piece of dust on a comparatively uniform screen such as a blue sky or a white wall surface, the effect of that piece of dust is noticeable in the captured image. However, if there is a piece of dust on a moving screen, the effect of that piece of dust is not as noticeable. This is because it is difficult for the human eye to pick out a small piece of dust in a rapidly changing screen.

When the size of the processed frame data is large, the amount of processed data increases, which causes the time required for the dust correction processing and the memory amount to increase. Thus, by determining whether the size of the frame data is more than or less than a given threshold, it can be determined whether dust correction processing should be performed on the frame or not.

If it is determined that the data size is larger than the threshold (X) and that dust correction processing should not be performed on the frame (NO in step S1802), the dust correction frame selection processing ends.

On the other hand, if it is determined that the data size is less than the threshold (X) and that dust correction processing should be performed on the frame (YES in step S1802), in step S1803, the dust position correction data is extracted from the "moov" or "moof" containing the selected frame.

Next, in step S1804, first the dust correction data is extracted from the dust position correction data extracted in step S1803, and a coordinate sequence Di (i=1, 2, ..., n), a radius sequence Ri (i=1, 2, ..., n), the aperture value f1, and the lens pupil position L1 are obtained. In addition, the aperture value f2 and lens pupil position L2 of when the image was captured are also acquired. Ri is the size of the dust with the coordinates Di calculated in step S1106 of FIG. 11.

In step S1804, Di is converted using the following equation. Here, d represents the distance from the image center to the coordinates Di, and H represents the distance between the surface of the imaging sensor 14 and the dust. Converted coordinates Di' and a converted radius Ri' are defined, for example, by the following equations.

$$Di'(x,y) = (L2 \times (L1-H) \times d/((L2-H) \times L1)) \times Di(x,y)$$

$$Ri' = (Ri \times f1/f2 + 3) \quad (1)$$

The unit in these equations are pixel, and the "+3" in the Ri' equation is a margin amount.

In step S1805, dust in the region represented by the coordinates Di' and the radius Ri' is detected, and interpolation processing is applied as necessary. The interpolation processing will be described in more detail below.

In step S1806, it is determined whether dust removal processing has been applied for all the coordinates. If dust removal processing has been applied for all the coordinates (YES in step S1806), the processing ends. If dust removal processing has not been applied for all the coordinates (NO in step S1806), the processing returns to step S1805. Thus, the dust correction frame selection processing is performed.

Figure 19:
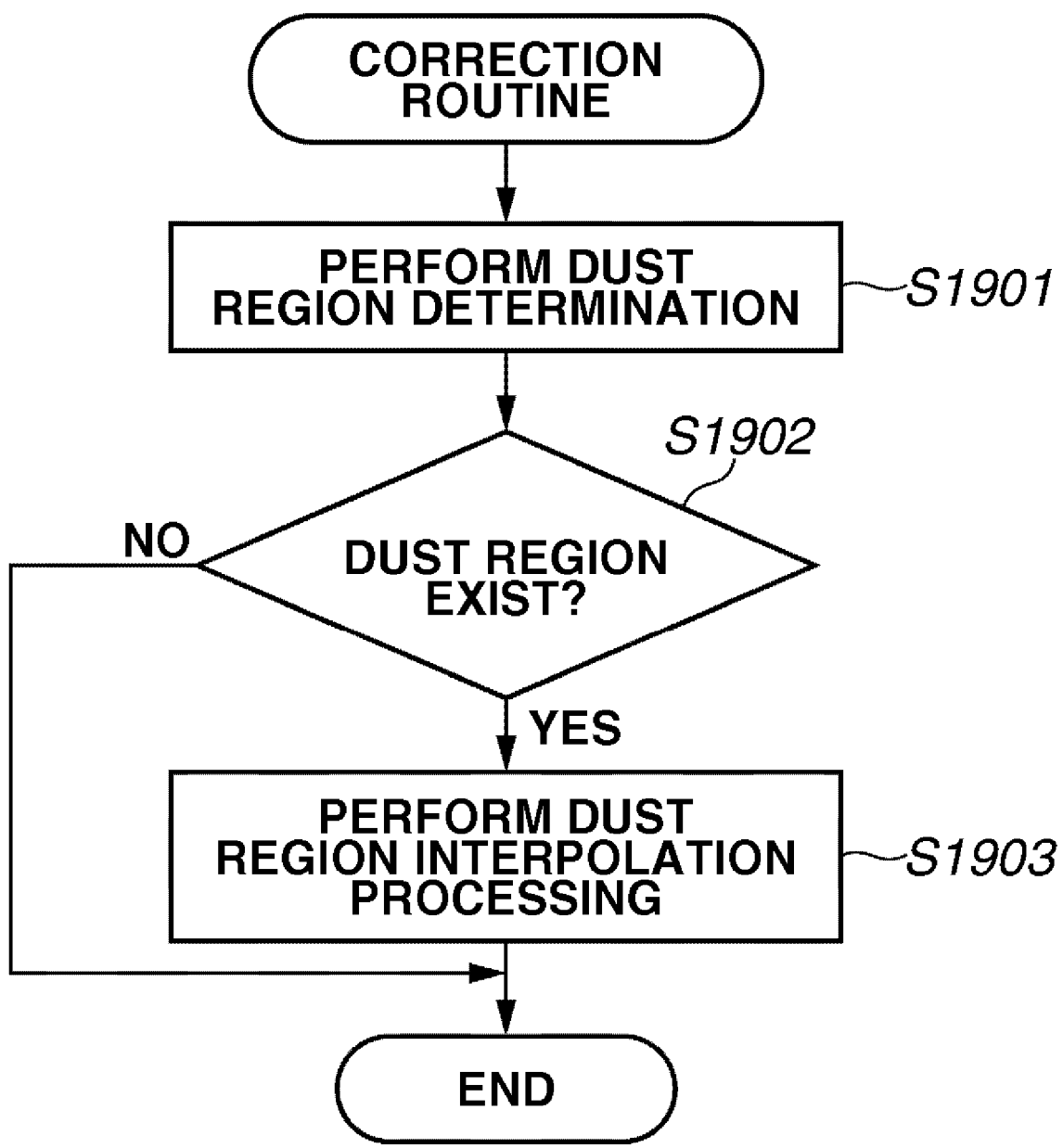
FIG. 19 is a flowchart illustrating details of an interpolation routine.

Next, the interpolation processing of the dust region will be described in more detail. FIG. 19 is a flowchart illustrating a flow of an interpolation routine. First, in step S1901, a dust region determination is performed. The dust region is a region that satisfies all of the following conditions.

(1) Region which is darker than a threshold value T2 determined by the following equation using an average luminance "Yave" and maximum luminance "Ymax" of the pixels contained in the center coordinates Di' and the radius Ri' (the Di' and Ri' determined by equation (1)) calculated in step S1804 of FIG. 18.

$$T2 = Yave \times 0.6 + Ymax \times 0.4$$

(2) Region that does not contact a circle determined by the center coordinates Di' and radius Ri'.

(3) Region in which a radius value calculated by the same method as in step S1106 of FIG. 11 is 11 or more pixels and less than 12 pixels for an isolated region constituted by pixels with a lower luminance than that selected in (1).

(4) Region including the center coordinates Di of the circle.

In the present exemplary embodiment, 11 is 3 pixels and 12 is 30 pixels. By setting in this manner, a small isolated region can be determined as the dust region. Further, when the lens pupil position cannot be correctly acquired, condition (4) may be broadened. For example, the condition can be set so that the dust region is determined if the focused region contains a coordinate in a range of respectively ±3 pixels in the X direction and the Y direction from the coordinates Di.

If it is determined in step S1902 that such a region exists (YES in step S1902), the processing proceeds to step S1903. In step S1903, dust region interpolation is performed. If it is determined in step S1902 that no such region exists (NO in step S1902), the processing ends. The dust region interpolation processing executed in step S1903 may be performed by a known deficiency region interpolation method.

Examples of known deficiency region interpolation methods include pattern substitution discussed in Japanese Patent Application Laid-Open No. 2001-223894. In Japanese Patent Application Laid-Open No. 2001-223894, a deficiency region is specified using infrared light. However, in the present exemplary embodiment, the dust region detected in step S1901 is determined as a deficiency region, and the dust region is interpolated by normal pixels surrounding the dust region by pattern substitution.

Pixels, which cannot be filled in by pattern substitution, may be interpolated by selecting p number of normal pixels in order closest to the interpolation target pixel of the image data after pattern interpolation, and using the average color thereof. Thus, the deficiency region interpolation processing is performed.

As described above, according to the present exemplary embodiment, the operating speed during playback of a moving image file, such as an MP4 file, while performing dust correction processing can be improved, and the amount of resources such as memory can be reduced, using dust information. Further, playback of a high-quality moving image in which the effect of dust and the like noticeable to the user is corrected can be provided.

The configuration of the image processing apparatus according to a second exemplary embodiment of the present invention is similar to that illustrated in FIG. 15, but its operations are different. The operations of the second exemplary embodiment will now be described.

Figure 20:
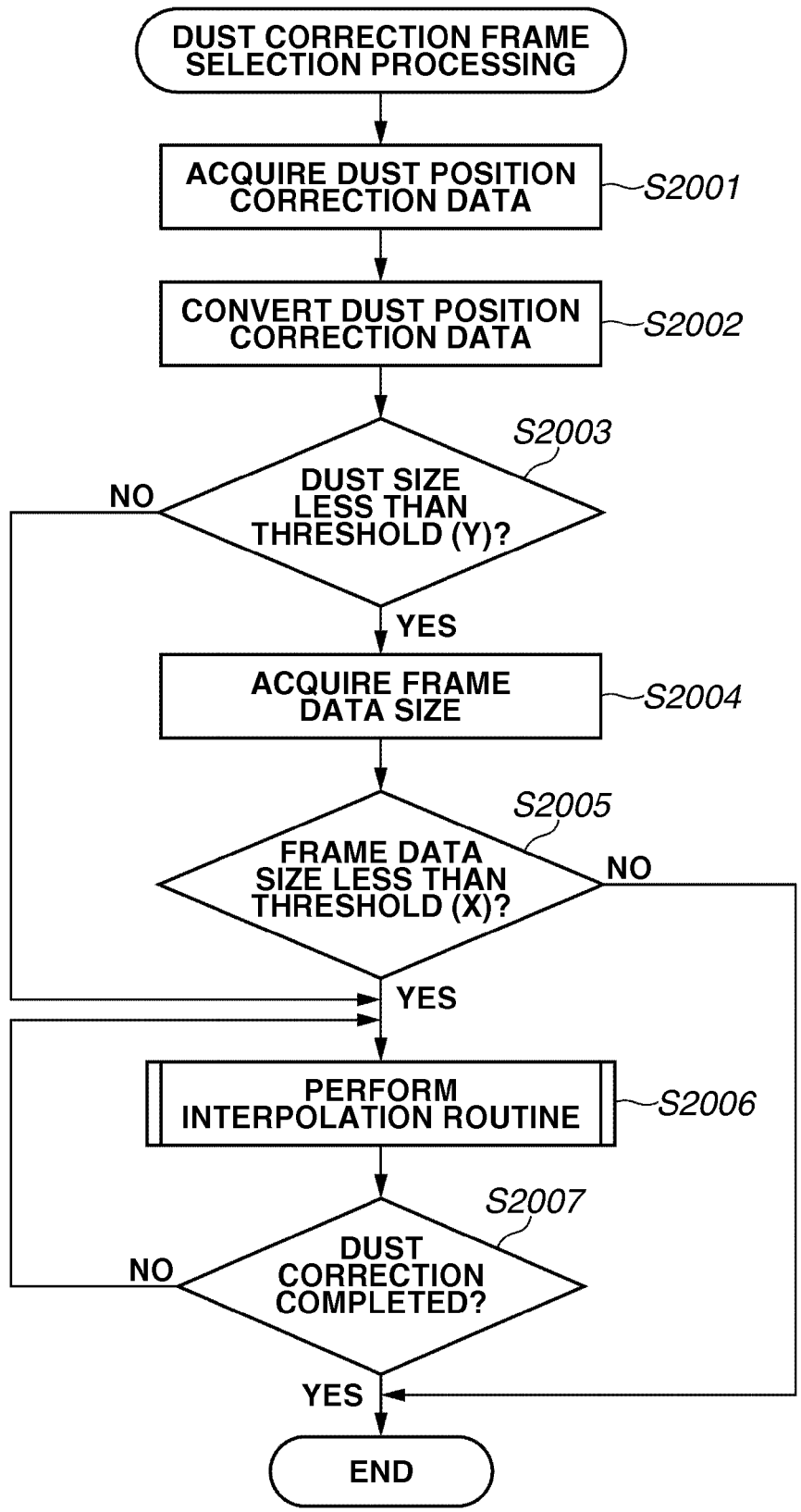
FIG. 20 is a flowchart illustrating details of dust correction frame selection processing according to a second exemplary embodiment.

FIG. 20 is a flowchart illustrating dust correction frame selection processing according to the second exemplary embodiment. FIG. 20 illustrates portions that are different from the first exemplary embodiment.

First, in step S2001, the dust position correction data is extracted from the "moov" or "moof" containing the selected frame. Then, in step S2002, the size of the dust is acquired in the same manner as in the first exemplary embodiment.

Next, in step S2003, it is determined whether the acquired dust size is less than a predetermined threshold (Y). This threshold (Y) may be determined statically or selected dynamically based on the playback operation environment. Obviously, this threshold value may also be determined by the user.

If the dust is large, the effect will be noticeable. Therefore, by determining whether the dust size is less than or more than a given threshold (Y), it can be determined whether or not dust correction should be performed on the dust.

If it is determined that the dust size is less than the threshold (Y) and that dust correction does not have to be performed on the dust (YES in step S2003), the processing proceeds to step S2004. In step S2004, like in the first exemplary embodiment, it is determined whether to perform dust correction based on the frame data size. The processing of the subsequent steps S2005 to 2007 is the same as that of steps S1802 to 1806 of FIG. 18, and thus a description thereof is omitted here.

On the other hand, if it is determined in step S2003 that the dust size is larger than the threshold (Y) (NO in step S2003) and that dust correction should be performed on the dust regardless of the frame data size, the processing proceeds to step S2006, and interpolation processing is performed. This interpolation processing has been already described in the first exemplary embodiment, and thus a description thereof is omitted here.

As described above, regardless of the frame data size, when the dust is larger than a predetermined size, correction of at least that piece of dust is performed. Therefore, the operating speed during playback of a moving image file, such as an MP4 file, while performing dust correction processing can be improved, and the amount of resources such as memory can be reduced, using dust information. Further, playback of a high-quality moving image, in which the photographed dust and the like noticeable to the user is corrected, can be provided.

The configuration of the image processing apparatus according to a third exemplary embodiment of the present invention is similar to that illustrated in FIG. 15, but its operations are different. The operations of the third exemplary embodiment will now be described.

Figure 21:
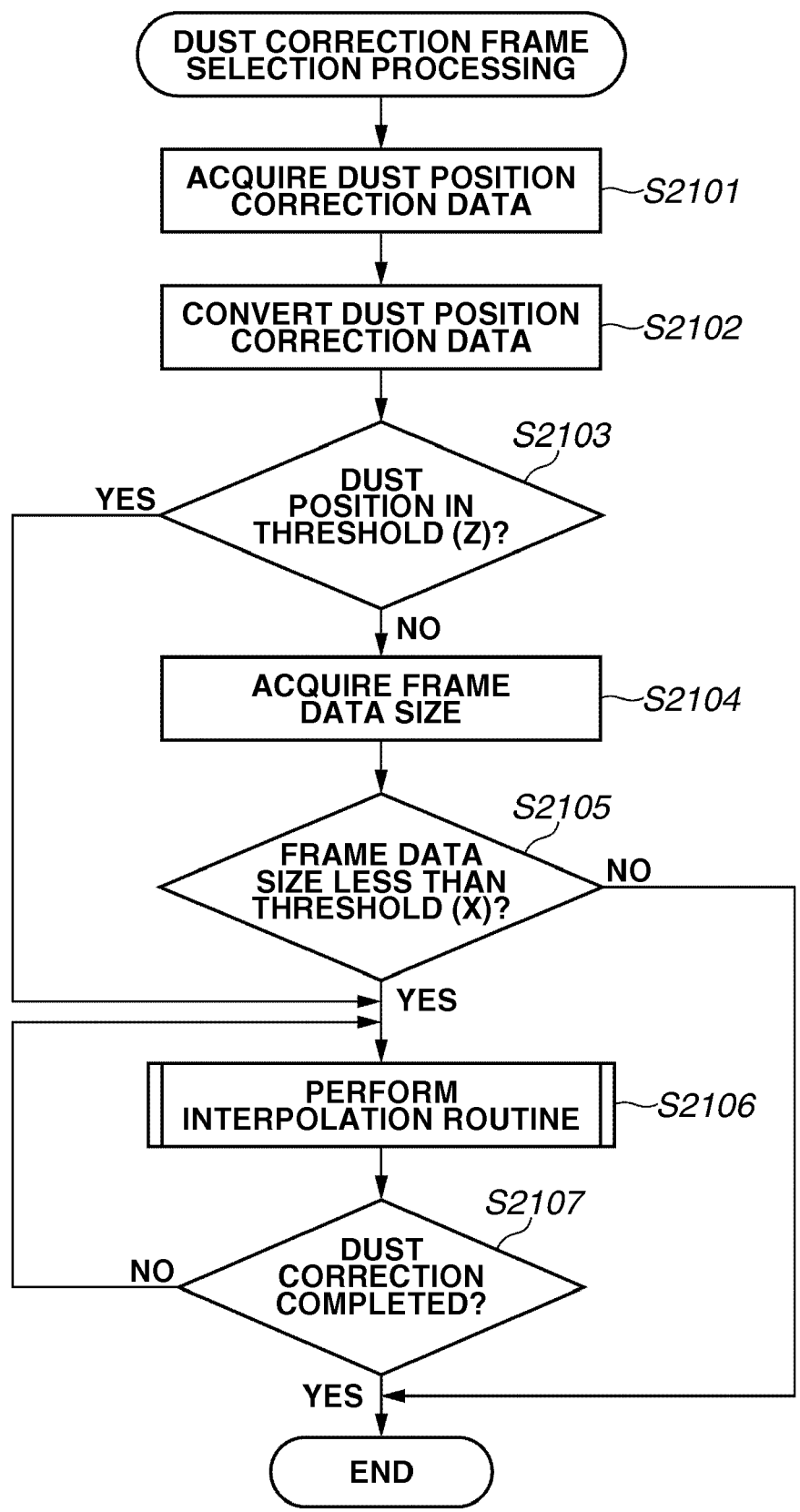
FIG. 21 is a flowchart illustrating details of dust correction frame selection processing according to a third exemplary embodiment.

The dust correction frame selection processing of the present exemplary embodiment is very similar to the dust correction frame selection processing described in the second exemplary embodiment. Portions that are different therefrom will now be described with reference to FIG. 21. FIG. 21 is a flowchart illustrating dust correction frame selection processing according to the third exemplary embodiment. FIG. 21 illustrates portions that are different from that of the first and second exemplary embodiments.

In the second exemplary embodiment, the size of the dust is acquired in steps S2001 and S2002. However, in the third exemplary embodiment, the position of the dust is acquired in steps S2101 and S2102 by a similar method.

Next, in step S2103, the acquired position of the dust is compared with a predetermined threshold (Z). This threshold (Z) is a value expressing a region in terms of position information. In step S2103, it is determined whether the position of the acquired dust is in the region defined by the threshold (Z) or not.

This threshold (Z) may be determined statically or selected dynamically based on the playback operation environment. Obviously, this value may also be determined by the user.

If the dust position is in a center portion or a position noticeable to the user, the dust image will be noticeable. Therefore, by setting the value of the threshold (Z) in information about a screen center portion or the position noticeable to the user, and thus determining whether the position of the dust is in the threshold (Z) or not, it can be determined whether or not dust correction should be performed on the dust. Further, the threshold (Z) is valid even when used in an enlarged display.

If it is determined that there is no dust in the threshold (Z) (NO in step S2103) and that dust correction does not have to be performed on the dust, the processing proceeds to step S2104. In step S2104, like in the first exemplary embodiment, it is determined whether to perform dust correction based on the frame data size. The processing of the subsequent steps S2104 to 2107 is the same as that of steps S1801 to 1806 of FIG. 18, and thus a description thereof is omitted here.

On the other hand, if it is determined in step S2103 that dust is in the threshold (Z) (YES in step S2103) and that dust correction should be performed on the dust, regardless of the frame data size, the processing proceeds to step S2106, and interpolation processing is performed. This interpolation processing has been already described in the first exemplary embodiment, and thus a description thereof is omitted here.

As described above, regardless of the frame data size, when there is dust in a given region, correction of at least that piece of dust is performed. As a result, the operating speed during playback of a moving image file, such as an MP4 file, while performing dust correction processing using dust information can be improved, and the amount of resources such as memory can be reduced. Further, playback of a high-quality moving image in which the reflection of dust and the like noticeable to the user was corrected can be provided.

The configuration of the image processing apparatus according to a fourth exemplary embodiment of the present invention is similar to that illustrated in FIG. 15, but its operations are different. The operations of the fourth exemplary embodiment will now be described.

Figure 22:
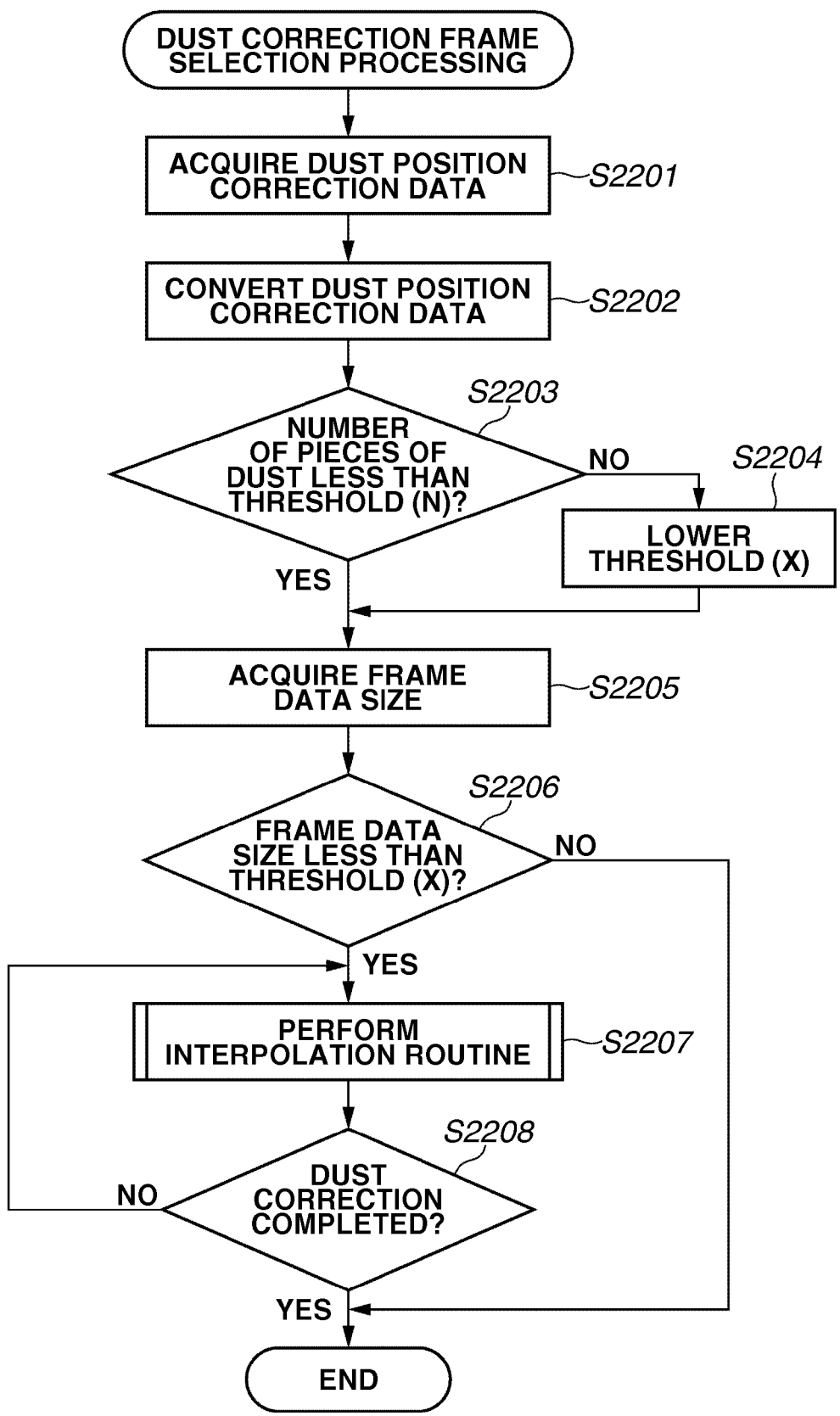
FIG. 22 is a flowchart illustrating details of dust correction frame selection processing according to a fourth exemplary embodiment.

FIG. 22 is a flowchart illustrating dust correction frame selection processing according to the fourth exemplary embodiment. FIG. 22 illustrates portions that are different from the first to third exemplary embodiments. In the second exemplary embodiment, the size of the dust is acquired in steps S2001 and S2002. However, in the fourth exemplary embodiment, the number of pieces of dust is acquired in steps S2201 and S2202 by a similar method.

Next, in step S2203, the acquired number of pieces of dust is compared with a predetermined threshold (N). This threshold (N) may be determined statically or selected dynamically based on the playback operation environment. Obviously, this threshold value may also be determined by the user.

If the number of pieces of dust is less than the threshold (N) (YES in step S2203), the processing proceeds directly to step S2205. In step S2205, like in the first exemplary embodiment, it is determined whether to perform dust correction based on the frame data size. The processing of steps S2205 to 2208 is the same as that of steps S1801 to 1806 of FIG. 18, and thus a description thereof is omitted here.

On the other hand, if it is determined that the number of pieces of dust is equal to or more than the threshold (N) (equal to or more than a predetermined number) (NO in step S2203), the processing proceeds to step S2204. In step S2204, processing is performed for reducing the threshold (X), which is the threshold of the frame data size described in the first exemplary embodiment (the determination reference value is changed).

Namely, when there is a large number of pieces of dust, the dust correction processing is performed only on pieces of image data with a smaller frame data size. Although the value by which the threshold (X) is reduced is arbitrary, this may also be managed by a table or the like.

For example, the processing may be performed so that if the number of pieces of dust is 100 or more to less than 200, the reduction value is 100, and if the number of pieces of dust is 200 or more to less than 300, the reduction value is 200.

The processing of the subsequent steps S2205 to 2208 is, as described above, the same as that of steps S1801 to 1806 of FIG. 18, and thus a description thereof is omitted here.

Thus, considering that the dust correction processing and the amount of memory to be used increase if the number of pieces of dust is large, by changing the threshold based on the number of pieces of dust, the operating speed can be improved and the amount of resources to be used (e.g., memory) can be reduced. Further, playback of a high-quality moving image, in which the effect of dust and the like noticeable to the user is corrected, can be provided.

The configuration of the image processing apparatus according to a fifth exemplary embodiment of the present invention is similar to that illustrated in FIG. 15, but its operations are different therefrom. The operations of the fifth exemplary embodiment will now be described.

Figure 23:
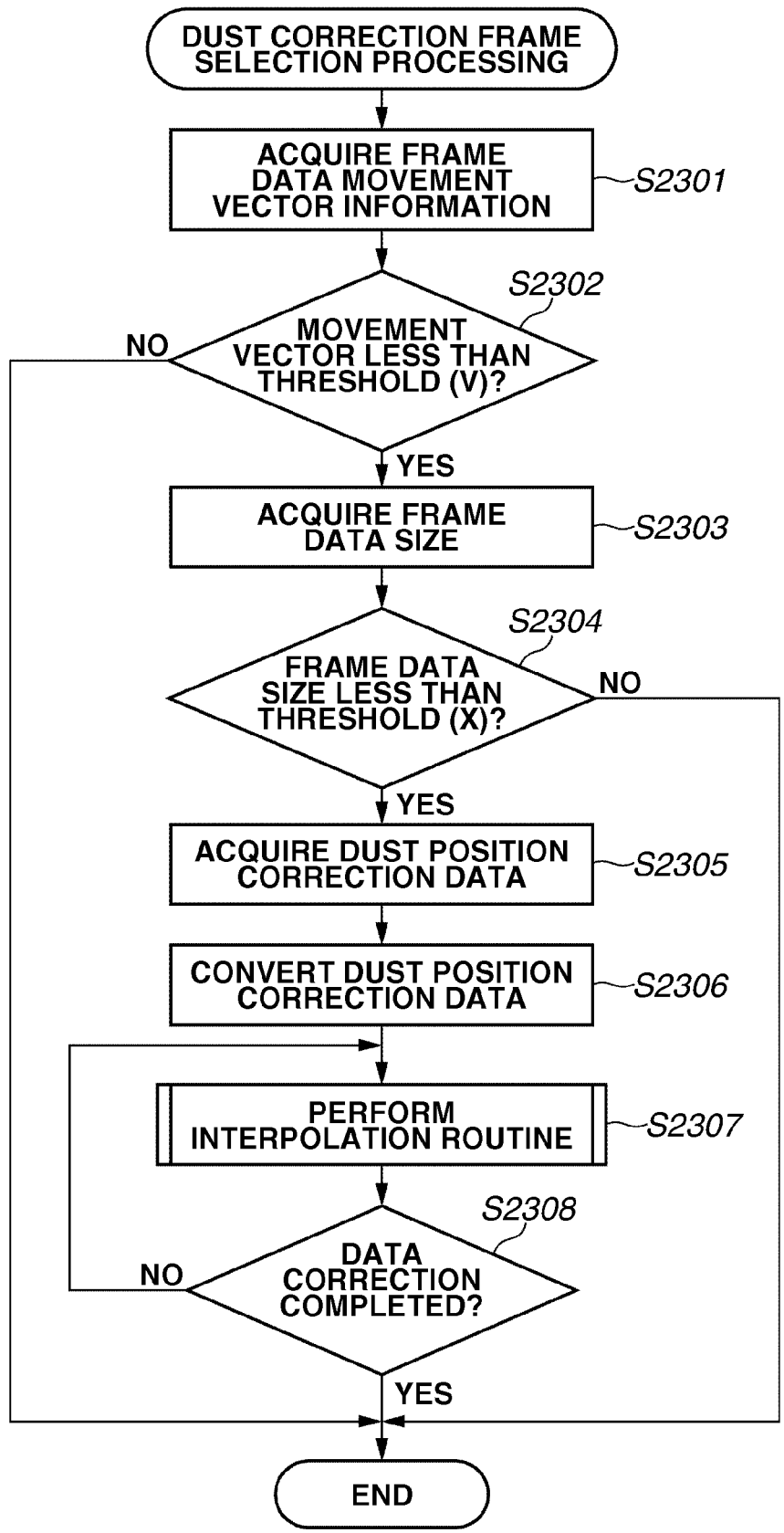
FIG. 23 is a flowchart illustrating in details of dust correction frame selection processing according to a fifth exemplary embodiment.

FIG. 23 is a flowchart illustrating dust correction frame selection processing according to the fifth exemplary embodiment.

First, in step S2301, movement vector information, which is described above in the background art, is acquired from the selected frame. Next, in step S2302, it is determined whether a value of the movement vector acquired in step S2301 is less than a threshold (V). This threshold (V) may be determined statically or selected dynamically based on the playback operation environment. Obviously, this value may also be determined by the user.

If it is determined that the movement vector value is equal to or more than the threshold (V) (equal to or more than a predetermined value) (NO in step S2302), it can be determined that the movement of the image is large and rapid without having to compare the frame data size. As a result, it can be determined that dust correction processing does not have to be performed on the frame, and thus the processing ends.

On the other hand, if the movement vector value is less than the threshold (V) (YES in step S2302), like in the first exemplary embodiment, it is determined whether to perform dust correction based on the frame data size. The processing of steps S2305 to 2308 is the same as that of steps S1801 to 1806 of FIG. 18, and thus a description thereof is omitted here.

As described above, regardless of the frame data size, when the movement vector is large, correction of at least that piece of dust is not performed. Therefore, the operating speed during playback of a moving image file, such as an MP4 file, while performing dust correction processing using dust information can be improved, and the amount of resources to be used (e.g., memory) can be reduced. Further, playback of a high-quality moving image in which the reflection of dust and the like noticeable to the user was corrected can be provided.

In the first to fifth exemplary embodiments, cases were described in which the dust correction playback processing is performed by a separately-provided image processing apparatus. However, the playback of a moving image file, such as an MP4 file, can also be performed by the imaging apparatus while performing the dust correction processing using dust information, by performing similar processing in the imaging apparatus.

Even in this case, by employing the methods of the above-described exemplary embodiments, operating speed can be improved, the used amount of resources (e.g., memory) can be reduced, and playback of a high-quality moving image, in which the effect of dust and the like noticeable to the user is corrected, can be provided.

Further, the object of the respective exemplary embodiments can also be achieved by the following methods. Namely, a storage medium (or a recording medium) on which the software program code for realizing the functions of the above-described exemplary embodiments is stored may be supplied to a system or an apparatus. Further, a computer (or a CPU or micro processing unit (MPU)) of that system or apparatus may read and execute the program code stored on that storage medium. In this case, the program code itself read from the storage medium realizes the functions of the exemplary embodiments, so that the storage medium that stores the program code constitutes the present invention.

Further, the functions of the above-described exemplary embodiments are not only realized by having a computer execute the read program code. The present invention also includes cases where, for example, based on an instruction from the program code, the operating system (OS) or the like running on the computer performs part or all of the actual processing, and from that processing the functions of the above-described exemplary embodiments are realized.

In addition, the present invention also includes cases where the program code read from a storage medium is written into a memory that is provided on a function expansion card inserted into the computer or a function expansion unit connected to the computer. Then, based on an instruction from that program code, a CPU or the like provided on the function expansion card or function expansion unit performs part or all of the actual processing. From that processing, the functions of the above-described exemplary embodiments are realized.

When the present invention is applied in the above-described storage medium, a program code corresponding to the above-described procedures is stored in that storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-174955 filed Jul. 3, 2008, which is hereby incorporated by reference herein in its entirety.

What is claimed is:

1. An image processing apparatus for playing back moving image data, which is output from an imaging unit including an imaging sensor configured to capture a target image and an optical member arranged in front of the imaging sensor, that includes a shadow of a foreign substance adhered to a surface of the optical member, the image processing apparatus comprising:
   an acquisition unit configured to acquire foreign substance information that includes information on a position and a size of the foreign substance in the imaging unit;
   a playback unit capable of correcting the shadow of the foreign substance of the moving image data using the foreign substance information acquired by the acquisition unit and playing back corrected moving image data; and
   a selection unit configured to select whether to perform processing for correcting the shadow of the foreign substance of a frame based on a data size of the frame of the moving image data to be played back by the playback unit.

2. The image processing apparatus according to claim 1 wherein, for a foreign substance determined to have a size equal to or greater than a fixed value based on the foreign substance information acquired by the acquisition unit, the selection unit selects to perform processing for correcting the shadow of the foreign substance, regardless of the data size of the frame of the moving image data.

3. The image processing apparatus according to claim 1, wherein, for a foreign substance determined to be in a pre-designated region based on the foreign substance information acquired by the acquisition unit, the selection unit selects to perform processing for correcting the shadow of the foreign substance, regardless of the data size of the frame of the moving image data.

4. The image processing apparatus according to claim 3, wherein, when a number of foreign substances is equal to or more than a fixed number determined based on the foreign substance information acquired by the acquisition unit, the selection unit changes a determination reference value of whether to perform processing for correcting the shadow of the foreign substance.

5. The image processing apparatus according to claim 1, wherein, when a vector value of a movement vector obtained by the playback unit is equal to or more than a predetermined value, the selection unit selects not to perform processing for correcting the shadow of the foreign substance, regardless of the data size of the frame of the moving image data.

6. An image processing apparatus for playing back moving image data, which is output from an imaging unit including an imaging sensor configured to capture a target image and an optical member arranged in front of the imaging sensor, that includes a shadow of a foreign substance adhered to a surface of the optical member, the image processing apparatus comprising:
 an acquisition unit configured to acquire foreign substance information that includes information on a position and a size of the foreign substance in the imaging unit;
 a playback unit capable of correcting the shadow of the foreign substance of the moving image data using the foreign substance information acquired by the acquisition unit and playing back corrected moving image data; and
 a selection unit configured to select whether to perform processing for correcting the shadow of the foreign substance of a frame, wherein
 the selection unit is configured to select not to perform processing for correcting the shadow of the foreign substance when a vector value of a movement vector of the moving image data is equal to or more than a fixed value.

7. A method for controlling an image processing apparatus for playing back moving image data, which is output from an imaging unit comprising an imaging sensor configured to capture a target image and an optical member arranged in front of the imaging sensor, that includes a shadow of a foreign substance adhered to a surface of the optical member, the method comprising:
 acquiring foreign substance information that includes information on a position and a size of the foreign substance in the imaging unit;
 correcting the shadow of the foreign substance of the moving image data using the acquired foreign substance information and playing back corrected moving image data; and
 selecting whether to perform processing for correcting the shadow of the foreign substance of a frame based on a data size of the frame of the moving image data to be played back.

8. A method for controlling an image processing apparatus for playing back moving image data, which is output from an imaging unit comprising an imaging sensor configured to capture a target image and an optical member arranged in front of the imaging sensor, that includes a shadow of a foreign substance adhered to a surface of the optical member, the method comprising:
 acquiring foreign substance information that includes information on a position and a size of the foreign substance in the imaging unit;
 correcting the shadow of the foreign substance of the moving image data using the acquired foreign substance information and playing back corrected moving image data; and
 selecting whether to perform processing for correcting the shadow of the foreign substance of a frame, wherein
 selecting not to perform processing for correcting the shadow of the foreign substance when a vector value of a movement vector of the moving image data is equal to or more than a predetermined value.

9. A computer-readable storage medium storing program data for executing a method for controlling an image processing apparatus for playing back moving image data, which is output from an imaging unit comprising an imaging sensor configured to capture a target image and an optical member arranged in front of the imaging sensor, that includes a shadow of a foreign substance adhered to a surface of the optical member, the method comprising:
 acquiring foreign substance information that includes information on a position and a size of the foreign substance in the imaging unit;
 correcting the shadow of the foreign substance of the moving image data using the acquired foreign substance and playing back corrected moving image data; and
 selecting whether to perform processing for correcting the shadow of the foreign substance of a frame based on a data size of the frame of the moving image data to be played back.

10. A computer-readable storage medium storing program data for executing a method for controlling an image processing apparatus for playing back moving image data, which is output from an imaging unit comprising an imaging sensor configured to capture a target image and an optical member arranged in front of the imaging sensor, that includes a shadow of a foreign substance adhered to a surface of the optical member, the method comprising:
 acquiring foreign substance information that includes information on a position and a size of the foreign substance in the imaging unit;
 correcting the shadow of the foreign substance of the moving image data using the acquired foreign substance and playing back corrected moving image data; and
 selecting whether to perform processing for correcting the shadow of the foreign substance of a frame, wherein
 the selection step selects not to perform processing for correcting the shadow of the foreign substance when a vector value of a movement vector of the moving image data is equal to or more than a fixed value.

* * * * *